(12) United States Patent
Liu et al.

(10) Patent No.: US 11,681,043 B2
(45) Date of Patent: Jun. 20, 2023

(54) DIFFRACTION IMAGING USING PSEUDO DIP-ANGLE GATHER

(71) Applicant: Saudi Arabian Oil Company, Dhahran (SA)

(72) Inventors: Lu Liu, Beijing (CN); Yi Luo, Dhahran (SA); Tong Wang Fei, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 381 days.

(21) Appl. No.: 16/559,008

(22) Filed: Sep. 3, 2019

(65) Prior Publication Data

US 2021/0063570 A1 Mar. 4, 2021

(51) Int. Cl.
*G01V 1/28* (2006.01)
*G01S 15/89* (2006.01)
*G06T 5/20* (2006.01)

(52) U.S. Cl.
CPC ............ *G01S 15/89* (2013.01); *G01V 1/28* (2013.01); *G06T 5/20* (2013.01); *G01V 2210/1212* (2013.01); *G01V 2210/46* (2013.01); *G01V 2210/57* (2013.01); *G06T 2207/20032* (2013.01)

(58) Field of Classification Search
USPC .......................................................... 367/7
See application file for complete search history.

(56) References Cited

U.S. PATENT DOCUMENTS

| | | | |
|---|---|---|---|
| 493,339 | A | 3/1893 | Phillips |
| 1,028,012 | A | 5/1912 | Foster |
| 3,441,631 | A | 4/1969 | Fernald et al. |
| 3,502,741 | A | 3/1970 | Fernald et al. |
| 3,688,249 | A | 8/1972 | Backus et al. |
| 3,691,529 | A | 9/1972 | Pizante |
| 4,449,208 | A | 5/1984 | Moeckel et al. |
| 4,562,540 | A | 12/1985 | Devaney |

(Continued)

FOREIGN PATENT DOCUMENTS

| CN | 105093301 | 11/2015 |
|---|---|---|
| CN | 106154319 | 11/2016 |

(Continued)

OTHER PUBLICATIONS

Bahorich and Farmer, "3D Seismic Discontinuity for Faults and Stratigraphic Features: the Coherence Cube," The Leading Edge, vol. 14, 1995, 6 pages.

(Continued)

*Primary Examiner* — James R Hulka
(74) *Attorney, Agent, or Firm* — Fish & Richardson P.C.

(57) ABSTRACT

Systems, methods, and apparatuses for generating a subsurface image using diffraction energy information are disclosed. The systems, methods, and apparatuses may include converting a shot gather into one or more plane-wave gather using a Radon transform. The plane-wave gathers may be extrapolated into source-side wavefields and receiver-side wavefields and further generate a pseudo dip-angle gather. The diffraction energy information may be extracted from the pseudo dip-angle gather, and an image containing subsurface features may be generated from the extracted diffraction energy information. The receiver-side wavefields may be decomposed using a recursive Radon transform.

14 Claims, 10 Drawing Sheets

(56) References Cited

U.S. PATENT DOCUMENTS

| | | | |
|---|---|---|---|
| 4,935,904 A | 6/1990 | Chambers et al. | |
| 5,292,837 A | 3/1994 | Heinrich et al. | |
| 6,767,975 B1 | 7/2004 | Liu | |
| 7,085,195 B2 | 8/2006 | Taner et al. | |
| 7,157,532 B2 | 1/2007 | Payer et al. | |
| 7,196,969 B1 | 3/2007 | Karazincir | |
| 7,373,252 B2 | 5/2008 | Sherrill et al. | |
| 7,643,377 B1 | 1/2010 | Uzes | |
| 7,970,546 B1 | 6/2011 | Peng | |
| 8,116,168 B1 | 2/2012 | Luo et al. | |
| 8,209,125 B2* | 6/2012 | Berkovitch | G01V 1/32 |
| | | | 702/14 |
| 8,227,653 B2 | 7/2012 | Weber et al. | |
| 8,248,886 B2* | 8/2012 | Neelamani | G01V 1/005 |
| | | | 367/73 |
| 8,675,447 B2* | 3/2014 | Poole | G01V 1/34 |
| | | | 367/41 |
| 8,803,878 B2* | 8/2014 | Andersen | G06T 7/11 |
| | | | 345/424 |
| 8,948,463 B2 | 2/2015 | Landa et al. | |
| 9,116,255 B2 | 8/2015 | Eick et al. | |
| 9,128,205 B2 | 9/2015 | Guan et al. | |
| 9,536,143 B2 | 1/2017 | Jiang et al. | |
| 9,568,627 B2 | 2/2017 | Guigne et al. | |
| 9,575,194 B2* | 2/2017 | Khalil | G01V 1/282 |
| 9,632,192 B2* | 4/2017 | Baina | G01V 1/282 |
| 9,633,472 B2* | 4/2017 | Thomas | G06T 17/00 |
| 9,651,694 B2* | 5/2017 | Zhang | G01V 1/36 |
| 9,696,445 B2* | 7/2017 | Kluver | G01V 1/38 |
| 9,702,997 B2 | 7/2017 | Sava et al. | |
| 9,715,027 B2* | 7/2017 | Gersztenkorn | G01V 1/364 |
| 9,724,681 B2 | 8/2017 | Lucciulli et al. | |
| 9,726,771 B1 | 8/2017 | Popovici et al. | |
| 9,733,371 B2* | 8/2017 | Burnett | G01V 1/30 |
| 9,766,357 B2* | 9/2017 | Cha | G01V 1/362 |
| 9,880,303 B2 | 1/2018 | Landa et al. | |
| 9,896,392 B2 | 2/2018 | Meiswinkel et al. | |
| 9,919,298 B2 | 3/2018 | Schmidt et al. | |
| 10,022,698 B2 | 7/2018 | Shaik et al. | |
| 10,232,339 B2 | 3/2019 | Bischof et al. | |
| 10,280,125 B2 | 5/2019 | Sogo et al. | |
| 10,281,604 B2* | 5/2019 | Jing | G01V 1/364 |
| 10,295,685 B2 | 5/2019 | Zhang et al. | |
| 10,310,113 B2* | 6/2019 | Sun | G01V 1/303 |
| 10,310,122 B2 | 6/2019 | Haacke et al. | |
| 10,324,204 B1 | 6/2019 | Sturzu et al. | |
| 10,557,954 B2* | 2/2020 | Tonellot | G01V 1/282 |
| 10,641,916 B2* | 5/2020 | Ozbek | G01V 1/003 |
| 10,889,533 B2* | 1/2021 | Melibari | C07C 2/10 |
| 10,928,533 B2* | 2/2021 | Ji | G01V 1/302 |
| 10,935,680 B2* | 3/2021 | Tsingas | G01V 1/282 |
| 11,029,431 B2* | 6/2021 | Zhang | G01V 1/303 |
| 11,041,970 B2 | 6/2021 | Zhang et al. | |
| 2004/0152850 A1* | 8/2004 | Payer | C08F 10/00 |
| | | | 526/124.3 |
| 2005/0219949 A1* | 10/2005 | Taner | G01V 1/28 |
| | | | 367/57 |
| 2007/0203673 A1* | 8/2007 | Sherrill | G01V 1/303 |
| | | | 702/189 |
| 2008/0285383 A1 | 11/2008 | An | |
| 2010/0097888 A1 | 4/2010 | Neelamani et al. | |
| 2010/0114494 A1 | 5/2010 | Higginbotham et al. | |
| 2010/0131205 A1 | 5/2010 | Berkovitch et al. | |
| 2010/0171740 A1 | 7/2010 | Andersen | |
| 2012/0016097 A1* | 1/2012 | Weber | C07C 2/30 |
| | | | 526/348 |
| 2012/0051176 A1 | 3/2012 | Liu | |
| 2012/0163121 A1 | 6/2012 | Hardage | |
| 2012/0300584 A1* | 11/2012 | Eick | G01V 1/345 |
| | | | 367/73 |
| 2012/0307591 A1 | 12/2012 | Hegna et al. | |
| 2013/0060476 A1 | 3/2013 | Thomson | |
| 2013/0077832 A1* | 3/2013 | Landa | G01V 1/28 |
| | | | 382/109 |
| 2013/0176819 A1 | 7/2013 | Poole | |
| 2014/0032119 A1 | 1/2014 | Landa et al. | |
| 2014/0133275 A1* | 5/2014 | Guan | G01V 1/301 |
| | | | 367/53 |
| 2014/0149046 A1 | 5/2014 | Baina et al. | |
| 2014/0269183 A1 | 9/2014 | Kluver et al. | |
| 2014/0293744 A1 | 10/2014 | Zhang | |
| 2014/0321713 A1* | 10/2014 | Sava | G01V 1/303 |
| | | | 382/109 |
| 2014/0328140 A1 | 11/2014 | Khalil et al. | |
| 2015/0063066 A1 | 3/2015 | Burnett et al. | |
| 2015/0103623 A1 | 4/2015 | Gersztenkom | |
| 2015/0112601 A1 | 4/2015 | Ozbek | |
| 2015/0124559 A1 | 5/2015 | Cha et al. | |
| 2015/0170411 A1 | 6/2015 | Thomas | |
| 2015/0203418 A1* | 7/2015 | Meiswinkel | C07C 2/36 |
| | | | 585/513 |
| 2015/0235081 A1* | 8/2015 | Jiang | G06T 7/50 |
| | | | 382/109 |
| 2015/0331123 A1* | 11/2015 | Guigne | G01V 1/28 |
| | | | 702/16 |
| 2016/0091624 A1 | 3/2016 | Haacke et al. | |
| 2016/0325274 A1 | 11/2016 | Schmidt | |
| 2016/0334526 A1 | 11/2016 | Pica | |
| 2016/0341837 A1 | 11/2016 | Eick | |
| 2016/0367977 A1 | 12/2016 | Shaikh et al. | |
| 2017/0001182 A1* | 1/2017 | Schmidt | B01J 31/0275 |
| 2017/0007994 A1* | 1/2017 | Lucciulli | B01J 31/0204 |
| 2017/0097428 A1 | 4/2017 | Sun | |
| 2017/0151547 A1* | 6/2017 | Shaik | C07C 2/08 |
| 2017/0197892 A1 | 7/2017 | Khawaji | |
| 2018/0164452 A1 | 6/2018 | Oukili et al. | |
| 2018/0239041 A1 | 8/2018 | Tsingas et al. | |
| 2018/0292554 A1 | 10/2018 | Zhang et al. | |
| 2018/0327332 A1* | 11/2018 | Sogo | C07C 2/30 |
| 2018/0345243 A1* | 12/2018 | Bischof | C07C 2/08 |
| 2018/0356547 A1 | 12/2018 | Tonellot et al. | |
| 2019/0092707 A1 | 3/2019 | Melibari et al. | |
| 2019/0179044 A1 | 6/2019 | Zhang et al. | |
| 2019/0179045 A1 | 6/2019 | Zhang et al. | |
| 2019/0353812 A1 | 11/2019 | Zhang et al. | |
| 2020/0341160 A1 | 10/2020 | Ji et al. | |
| 2021/0181364 A1 | 6/2021 | Zhang et al. | |
| 2021/0215842 A1 | 7/2021 | Liu et al. | |
| 2021/0278558 A1 | 9/2021 | Zhang et al. | |

FOREIGN PATENT DOCUMENTS

| | | | |
|---|---|---|---|
| CN | 109307890 | 2/2019 | |
| EP | 0109341 | 2/1991 | |
| EP | 3029491 | 6/2016 | |
| EP | 3163328 A1 * | 5/2017 | G01V 1/282 |
| GB | 2483997 | 3/2012 | |
| WO | WO2011154762 | 12/2011 | |
| WO | WO 2013163131 | 10/2013 | |
| WO | WO 2016156530 | 10/2016 | |

OTHER PUBLICATIONS

Chen et al., "Directly imaging steeply-dipping fault zones in geothermal fields with multicomponent seismic data," Geothermics, vol. 57, Sep. 1, 2015, 31 pages.

Fei et al., "An Endemic Problem in Reverse-Time Migration," 84th Annual International Meeting, SEG, Expanded Abstracts, Published in 2014, pp. 3811-3815.

Fei et al., "Removing False Images in Reverse-Time Migration: The Concept of De-Primary," Geophysics, vol. 80, No. 6, Nov.-Dec. 2015, pp. S237-S244.

Fletcher, "Suppressing Unwanted Internal Reflections in Prestack Reverse-Time Migration," Geophysics, vol. 71, No. 6, Nov.-Dec. 2006, pp. E79-E82.

Fomel, "Theory of 3-D Angle Gathers in Wave-Equation Imaging," 74th Annual International Meeting, SEG, Expanded Abstracts, Oct. 2004, pp. 1053-1056.

Forestiere et al., "Oligomerization of Monoolefins by Homogenous Catalysts", Oil & Science and Technology Review de l'Institute

(56) References Cited

OTHER PUBLICATIONS

Francais du Petrole, vol. 64, No. 6, Nov. 2009, pp. 663-664, 20 pages.

Hu et al., "Angle gathers from reverse time migration using analytic wavefield propagation and decomposition in the time domain," Geophysics, vol. 81, No. 1, Jan. 1, 2016, 9 pages.

Kim et al., "3D Least-Squares Reverse Time Migration Using Wavefield Decomposition via Hilbert transform," 79th EAGE Conference & Exhibition, Jun. 12, 2017, 5 pages.

Liu et al., "An Effective imaging Condition for Reverse-Time Migration using Wavefield Decomposition," Geophysics, vol. 76, No. 1, Jan. 2011, pp. S29-S39.

Liu et al., "Reverse-Time Migration using One-Way Wavefield Imaging Condition," 77th Annual International Meeting, SEG Expanded Abstracts, published in 2007, pp. 2170-2174.

Luo et al., "Edge-preserving smoothing and applications," The Leading Edge, vol. 21, 2002, 5 pages.

Mahdaviani et al., "Selective Ethylene Dimerization Toward 1-butene by a New Highly Efficient Catalyst System and Determination of Its Optimum Operating Conditions in a Buchi Reactor," International Journal of Chemical Engineering and Applications, vol. 1, No. 3, Oct. 2010, pp. 276-281, 6 pages.

Sava et al., "Angle-Domain Common Image Gathers by Wavefield Continuation Methods," Geophysics, 68, May-Jun. 2003, pp. 1065-1074.

Wang et al., "RTM Artifact Removal via a Fast Algorithm for Wavefield Decomposition," 2016 SEG International Exposition and 86th Annual Meeting, 2016.

Wang et al., "Up/down and P/S decompositions of elastic wavefields using complex seismic traces with applications to calculations Poynting vectors and angle-domain common-image gathers from reverse time migrations," Geophysics, vol. 81, No. 4, Jul. 1, 2016, 15 pages.

Xu et al., "3D Angle Gathers from Reverse-Time Migration," Geophysics, vol. 76, No. 2, Mar.-Apr. 2011, pp. S77-S92.

Zhang et al., "Efficient Wave-Equation-Based Diffraction Imaging," Geophysics, vol. 82, No. 5, Sep.-Oct. 2019, 11 pages.

Zhang et al., "Improving reverse time migration angle gathers by efficient wavefield separation". Geophysics, vol. 83, No. 2, Mar. 1, 2018, pp. S187-S195.

Zhang et al., "RTM angle gathers by optical flow with wavefield separation", SEG Technical Program Expanded Abstracts 2018, Aug. 27, 2018, 5 pages.

Zhang, "RTM Angle Gathers and Specular Filter (SF) RTM using Optical Flow," 84rd Annual International Meeting, SEG, Expanded Abstracts, Copyright 2014, pp. 3816-3820.

Gulf Cooperation Council Examination Report issued in GCC Appln. No. GC 2018-35094, dated on Nov. 7, 2019, 4 pages.

PCT International Search Report and Written Opinion in International Appln. No. PCT/US2019/031421, dated Aug. 5, 2019, 17 pages.

PCT International Search Report and Written Opinion issued in International Appln. No. PCT/US2018/049834, dated Dec. 20, 2018, 17 pages.

PCT International Search Report and Written Opinion issued in International Appln. No. PCT/US2018/026071, dated Jul. 9, 2018, 15 pages.

GCC Examination Report in GCC Appln. No. GC 2019-37569, dated Jun. 6, 2021, 4 pages.

Khaidukov et al., "Diffraction imaging by focusing-defocusing: An outlook on seismic superresolution," Geophysics vol. 69, No. 6, Nov.-Dec. 2004, 13 pages.

Klokov et al, "Separation and imaging of seismic diffractions using migrated dip-angle gathers," Geophysics, 77(6), S131-S143. doi:10.1190/geo2012-0017.1.

Kong et al, "Diffraction separation by plane-wave prediction filtering," Chinese Geophysical Society, Appl. Geophys. (2017) 14: 399, Jul. 2017.

Landa et al., "Separation, imaging and velocity analysis of seismic diffractions using migrated dip-angle gathers," 78th Annual International Meeting, SEG, Expanded Abstracts, 2008, 5 pages.

Liu and Lu, "Diffraction Imaging Based on Dip Angle Gather of Seismic Wave Equation Migration," Near Surface Geophysics Asia Pacific Conference, Beijing, China, Jul. 17-19, 2013, 4 pages.

Liu et al., "Imaging diffractors using wave-equation migration," Geophysics vol. 81, No. 6, 2016, 10 pages.

Popovici et al., "High resolution diffraction imaging of small scale fractures in shale and carbonate reservoirs," Unconventional Resources Technology Conference, 2015, 9 pages.

Qin et al., "Kirchhoff preSDM interactive dip-gather stacking and dip illumination panel generation," 75th Annual International Meeting, SEG, Expanded Abstracts, 2005, 5 pages.

Schoepp et al., "Multifocusing 3D diffraction imaging for detection of fractured zones in mudstone reservoirs: Case history," Interpretation 3(1), Feb. 2015, 12 pages.

Sturzu et al., "Diffraction imaging using specularity gathers," Journal of Seismic Exploration, vol. 23, 2014, 18 pages.

Sun et al., "Comparative study of dip-angle domain Gaussian beam migration and Kirchhoff migration in diffraction separation," SEG Technical Program Expanded Abstracts, 2014, 5 pages.

Taner et al, "Separation and imaging of seismic diffractions using plane-wave decomposition," SEG Technical Program Expanded Abstracts, 25(1), Jan. 2006.

Zhang and Zhang, "Diffraction imaging using shot and opening-angle gathers: A prestack time migration approach," Geophysics vol. 79, No. 2, 2014, 11 pages.

PCT International Search Report and Written Opinion in International Appln. No. PCT/US2021/021484, dated Jun. 24, 2021, 13 pages.

GCC Examination Report in GCC Appln. No. GC 2019-37569, dated Jun. 29, 2020, 4 pages.

Dafni et al., "Diffraction imaging by prestack reverse-time migration in the dip angle domain: diffraction imaging by reverse-time migration," Geophysical Prospecting, Oct. 2017, 65(14):295-316.

PCT International Search Report and Written Opinion in International Appln. No. PCT/US2020/049045, dated Dec. 15, 2020, 19 pages.

CN Office action in Chinese Appln. No. 201880037535.2, dated Apr. 30, 2021, 21 pages (With English Translation).

He et al., "Reflection waveform inversion with variable density." Journal of Applied Geophysics 170, 103827, Nov. 2019, 16 pages.

PCT International Search Report and Written Opinion in International Appln. No. PCT/US2021/012193, dated Apr. 20, 2021, 18 pages.

Gong et al., "Polarized Wavefield Magnitudes with Optical Flow for Elastic Angle-Domain Common-Image Gathers," Geophysics, Jul.-Aug. 2016, 81(4):S239-S251.

Gulf Cooperation Council Examination Report issued in GCC Appln. No. GC 2018-35094 dated Mar. 4, 2020, 3 pages.

PCT International Search Report and Written Opinion in International Appln. No. PCT/US2020/064511, dated Apr. 1, 2021, 17 pages.

Wang et al., "Reverse Time Migration with Hilbert Transform Based Full Wavefield Decomposition" Chinese Journal of Geophysics—Chinese Edition 59.11, Nov. 2016, 4200-4211, 12 pages.

Zhong et al., "Reverse Time Migration of Ground-Penetrating Radar with Full Wavefield Decomposition Based on the Hilbert Transform" Geophysical Prospecting 68.4, Apr. 2020, 1097-1112, 16 pages.

GCC Examination Report in GCC Appln. No. GC 2019-37569, dated Nov. 24, 2020, 5 pages.

GCC Examination Report in GCC Appln. No. GC 2020-40381, dated Oct. 28, 2021, 4 pages.

GCC Examination Report in GCC Appln. No. GC 2020-41105, dated Oct. 24, 2021, 6 pages.

Batany et al., "Adaptive multiple subtraction: Unification and Comparison of matching filters based on the lq-norm and statistical independence," Geophysics vol. 81, No. 1, Jan.-Feb. 2016, 13 pages.

(56) References Cited

OTHER PUBLICATIONS

Berkhout and Verschuur, "Estimation of multiple scattering by iterative inversion, Part I: Theoretical considerations," Geophysics vol. 62, No. 5, Sep.-Oct. 1997, 10 pages.

Chen and Fomel, "Random noise attenuation using local signal-and-noise orthogonalization," Geophysics vol. 80, No. 6, WD1-WD9, 2015, 19 pages.

Donno, "Improving multiple removal using least-squares dip filters and independent component analysis," Geophysics vol. 76, No. 5, Sep.-Oct. 2011, 14 pages.

Donno et al., "Curvelet-based multiple prediction," Geophysics vol. 75, No. 6, Nov.-Dec. 2010, 9 pages.

Fomel, "Shaping regularization in geophysical-estimation problems," Geophysics vol. 72, No. 2, Mar.-Apr. 2007, 8 pages.

Guitton and Verschuur, "Adaptive subtraction of multiples using the L1-norm," Geophysical Prospecting, vol. 52, Issue 1, Jan. 2004, 12 pages.

Guitton, "Multiple attenuation in complex geology with a pattern-based approach," Geophysics vol. 70, No. 4, Jul.-Aug. 2005, 11 pages.

Herrmann et al., "Non-linear primary-multiple separation with directional curvelet frames," Geophysical Journal International vol. 170, Issue 2, Aug. 2007, 19 pages.

Kim et al., "Increasing signal-to-noise ratio of marine seismic data: a case study from offshore Korea," Journal of Applied Geophysics, vol. 134, Nov. 2016.

Li and Lu, "Demultiple strategy combining Radon filtering and Radon domain adaptive multiple subtraction," Journal of Applied Geophysics, vol. 103, Apr. 2014, 11 pages.

Rickett et al., "P167—Adaptive multiple subtraction with non-stationary helical shaping filters," EAGE 63rd Conference and Technical Exhibition, Jun. 11-15, 2001, 4 pages.

Spitz, "Pattern recognition, spatial predictability and subtraction of multiple events," the Leading Edge, Jan. 1999, 4 pages.

Ventosa et al., "Adaptive multiple subtraction with wavelet-base complex urary Wiener filters," Jun. 2018, published in Geophysics vol. 77, Nov.-Dec. 2012, 18 pages.

Verschuur et al., "Adaptive surface-related multiple elimination," Geophysics vol. 57, No. 9, Sep. 1992, 12 pages.

Wang, "Multiple subtraction using an expanded multichannel matching filter," Geophysics vol. 68, No. 1, Jan.-Feb. 2003, 9 pages.

Wiggins, "Multiple attenuation by explicit wave extrapolation to an interpreted horizon," the Leading Edge, Jan. 1999, 7 pages.

Xue et al., "Amplitude-perserving nonlinear adaptive multiple attenuation using the high order sparse Radon Transform," Sinopec Geophysical Research Institute, IOP Science, Journal of Geophysics and Engineering, vol. 31, No. 3, Apr. 2016, 2 pages.

* cited by examiner

DIFFRACTION IMAGING USING PSEUDO DIP-ANGLE GATHER

TECHNICAL FIELD

This present disclosure relates to generating diffraction images from seismic data.

BACKGROUND

Diffraction images can directly indicate fault surfaces, fracture zones, and erosional surfaces that are important to the interpretation of reservoirs. These geological heterogeneities generally lie close to reservoirs, and knowledge of these heterogeneities assists in the development of well designs to access reservoirs.

SUMMARY

A first aspect of the present disclosure is directed to a computer-implemented method performed by one or more processors for generating an image of subsurface features of a portion of the earth using diffraction energy. The computer-implemented method may include receiving shot gathers formed from a plurality of shots; converting the shot gather into one or more plane-wave gathers; selecting one of the plane-wave gathers; extrapolating source-side wavefields of the plane-wave gather; extrapolating and decomposing receiver-side wavefields of the plane-wave gather; forming a pseudo dip-angle gather by applying an imaging condition to the extrapolated plane-wave source-side wavefields and the extrapolated and decomposed plane-wave receiver-side wavefields; extracting the diffraction image information from the pseudo dip-angle gather; and generating a stacked diffraction image representative of subsurface features of a portion of the earth.

Another aspect of the present disclosure is directed to a computer program product encoded on a non-transitory medium. The computer program product may include computer readable instructions for causing one or more processors to perform operations including: receiving shot gathers formed from a plurality of shots; converting the shot gather into one or more plane-wave gathers; selecting one of the plane-wave gathers; extrapolating source-side wavefields of the plane-wave gather; extrapolating and decomposing receiver-side wavefields of the plane-wave gather; forming a pseudo dip-angle gather by applying an imaging condition to the extrapolated plane-wave source-side wavefields and the extrapolated and decomposed plane-wave receiver-side wavefields; extracting the diffraction image information from the pseudo dip-angle gather; and generating a stacked diffraction image representative of subsurface features of a portion of the earth.

A further aspect of the present disclosure is directed to an apparatus for generating an image of subsurface features using diffraction energy information. The apparatus may include one or more processors and a non-transitory computer-readable storage medium coupled to the one or more processors and storing programming instructions for execution by the one or more processors. The programming instructions may be operable to instruct the one or more processors to: receive shot gathers formed from plurality of shots; convert the shot gather into one or more plane-wave gathers; select one of the plane-wave gathers; extrapolate source-side wavefields of the plane-wave gather; extrapolate and decompose receiver-side wavefields of the plane-wave gather; form a pseudo dip-angle gather by applying an imaging condition to the extrapolated plane-wave source-side wavefields and the extrapolated and decomposed plane-wave receiver-side wavefields; extract the diffraction image information from the pseudo dip-angle gather; and generate a stacked diffraction image representative of subsurface features of a portion of the earth.

The various aspects may include one or more of the following features. The following steps may be repeated for each remaining plane-wave gather: extrapolating the plane-wave source-side wavefields of the plane-wave gather; extrapolating and decomposing the plane-wave receiver-side wavefields of the plane-wave gather; and forming the pseudo-dip angle gather by applying the imaging condition to the extrapolated plane-wave source-side wavefields and the extrapolated and decomposed plane-wave receiver-side wavefields. Forming a pseudo dip-angle gather by applying an imaging condition to the extrapolated plane-wave source-side wavefields and the extrapolated and decomposed plane-wave receiver-side wavefields may include combining the extrapolated source-side wavefields and the extrapolated and decomposed receiver-side wavefields generated from all of the plane-wave gathers into the pseudo-dip angle gather. Converting the shot gather into one or more plane-wave gathers may include applying a Radon transform to the shot gather to generate the one or more plane-wave gathers. Decomposing the receiver-side wavefields of the plane-wave gather may include applying a recursive Radon transform to the receiver-side wavefields of the plane-wave gather. Applying a recursive Radon transform to the receiver-side wavefields of the plane-wave gather may include applying a windowed recursive Radon transform to the receiver-side wavefields of the plane-wave gather. Extracting the diffraction image information from the pseudo-dip angle gather may include applying a windowed median filter to the pseudo dip-angle gather to remove reflection energy information from the diffraction energy information. Combining the extrapolated plane-wave source-side wavefields and the extrapolated and decomposed plane-wave receiver-side wavefields to form a pseudo-dip angle gather may include forming the pseudo dip-angle using the relationships:

$$I(x,z,\beta;p) = \int S(x,z,\omega;p) R(x,z,\omega,\theta_r;p) d\omega,$$

$$\beta = (\theta'_s + \theta_r)/2,$$

where $I(x,z,\beta;p)$ is the pseudo dip-angle gather; $S(x,z,\omega;p)$ is the extrapolated plane-wave source-side wavefields at spatial location $(x,z)$ with a ray parameter p corresponding to a surface incident angle and frequency $\omega$; $R(x,z,\omega,\theta_r;p)$ is the decomposed plane-wave receiver-side wavefields obtained using the recursive Radon transform; $\theta'_s$ is the surface incident angle of the associated plane-wave gather which is used as the propagation angle for source-side wavefields at the surface image points; $\theta_r$ is the propagation angle of the plane-wave receiver-side wavefield; and $\beta$ is the pseudo dip-angle.

The details of one or more embodiments of the present disclosure are set forth in the accompanying drawings and the description that follows. Other features, objects, and advantages of the present disclosure will be apparent from the description and drawings, and from the claims.

DESCRIPTION OF DRAWINGS

Like reference symbols in the various drawings indicate like elements.

DETAILED DESCRIPTION

Figure 2:
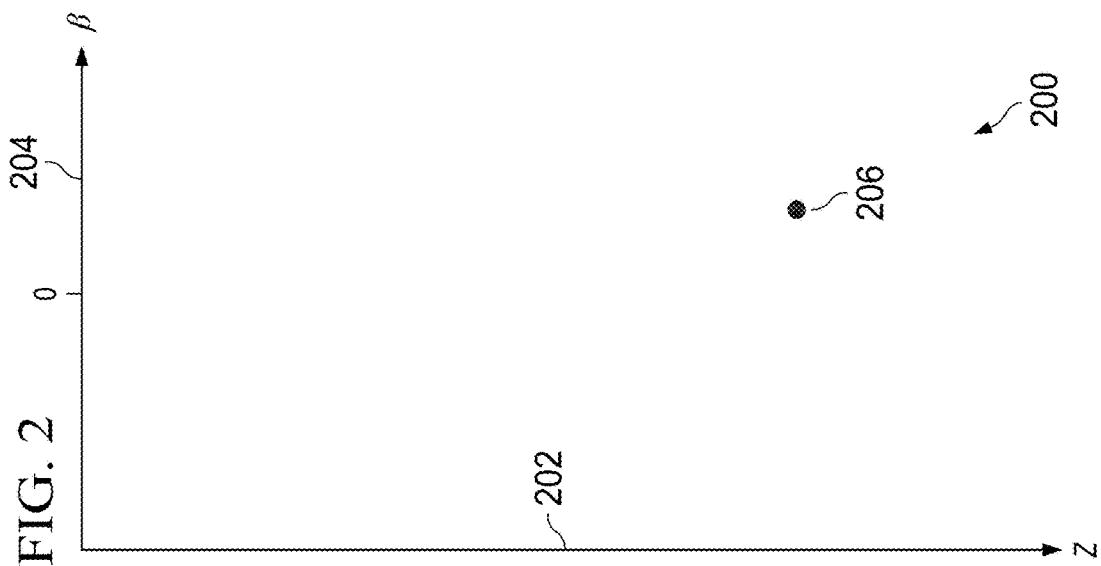
FIG. 2 is an illustration of a reflection case in a dip-angle gather.

For the purposes of promoting an understanding of the principles of the present disclosure, reference will now be made to the implementations illustrated in the drawings, and specific language will be used to describe the same. Nevertheless, no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination of such described with respect to one implementation may be combined with the features, components, steps, or a combination of such described with respect to other implementations of the present disclosure.

Obtaining diffraction images can be challenging since diffraction energy data are much weaker than reflection energy, generally one or two magnitudes weaker. Some current approaches involve generating a dip-angle gather based on ray theory. However, ray theory approaches are based on high-frequency approximation. That is, in ray theory, the medium is assumed to vary smoothly compared to wavelength and, thus, does not contain sharp discontinuities. Consequently, ray theory approaches do not represent the wave phenomenon well in complex subsurface media due to the uncertainty associated with the multiple paths along which rays may travel. As a result, these approaches lead to image inaccuracy. The present disclosure provides systems and methods for generating diffraction images while avoiding the deficiencies of ray theory-based approaches.

The present disclosure is directed to systems and method for generating diffraction images and, more particularly, to generating diffraction images from seismic data from which reflection energy has been removed. Creation of the diffraction images involves the use of the acoustic wave equation. Seismic data produced via a plurality of shots are converted into plane-wave gathers using a linear Radon transform. The shot may be performed during the course of a seismic survey. Using a recursive Radon transform, the receiver-side plane-wave gathers are decomposed into different components with different incident angles to form pseudo dip-angle gathers. The recursive Radon transform, described in more detail later, utilizes fewer computational resources than existing approaches. As a result, the recursive Radon transform produces results more quickly than existing approaches. A windowed median filter is applied to the pseudo dip-angle gathers to extract the diffraction energy data, thereby suppressing the reflection energy data.

In the course of generating diffraction images, the present disclosure describes extrapolation of the plane-wave gathers and plane-wave sources simultaneously using plane-wave gathers and a recursive Radon transform. This extrapolation generates associated receiver-side and source-side wavefields. The pseudo-dip angle gather is generated by making the surface incident angle of a plane-wave gather the same as the subsurface incident angle of an associated source-side wavefields and decomposing the receiver-side wavefields using the recursive Radon transform. The normal dip-angle gathers are produced by extrapolating the plane-wave gathers and the plane-wave sources simultaneously, decomposing the source-side and receiver-side wavefields into different components with different propagation angles, and applying an image condition.

The systems and method of the present disclosure use the acoustic wave equation as an extrapolation engine to generate the diffraction images. Further, efficiency in producing the diffraction images as described in the present disclosure is improved by: converting the original shot records into plane-wave gathers; using a recursive Radon transform to decompose extrapolated receiver-side wavefields; and generating new pseudo dip-angle gathers. The extrapolated receiver-side wavefields are generated by extrapolating the plane-wave gathers using the acoustic wave equation. The systems and methods described in the present disclosure produce accurate diffraction images using both synthetic and field data sets.

According to the Snell's law, an incident wave generates one specular reflected wave when encountering one reflector, but the incident wave produces multi-angle scattering waves when encountering one diffractor. This well-known phenomenon is observable in a dip-angle gather and serves as the fundamental physics that separates the diffraction energy and reflection energy.

Figure 1:
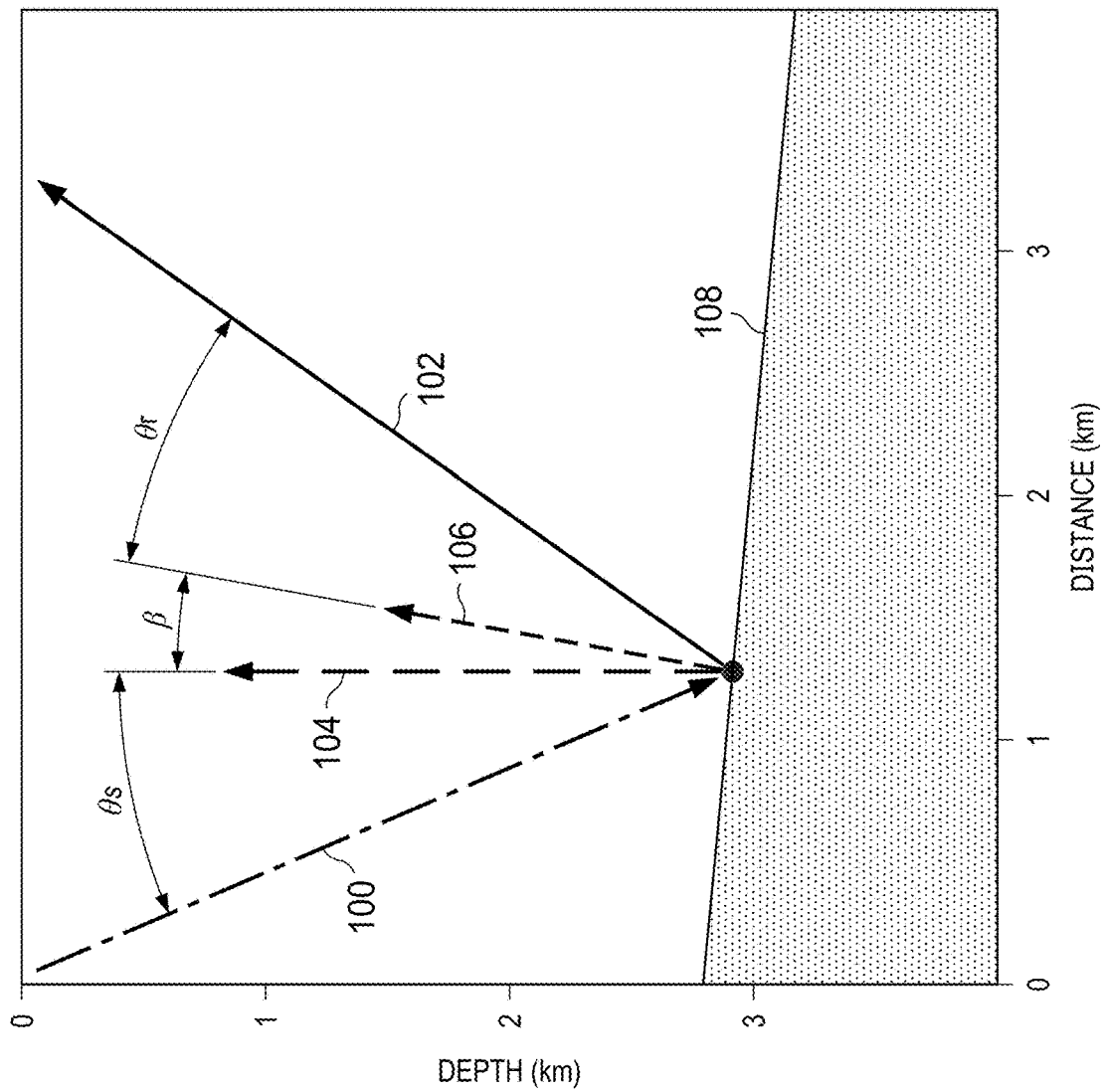
FIG. 1 is a schematic illustration of reflection energy behavior.

FIG. 1 demonstrates a reflection case in dip-angle gather. $\theta_s$ and $\theta_r$ are the propagation angles of source-side incident ray 100 and receiver-side reflected ray 102, respectively. The y-axis represents a depth, in kilometers (km), below the surface, and the x-axis represents a horizontal distance, in km, away from a seismic source. These angles are measured from a vertical axis 104. A dip angle β is the angle measured between a line 106 normal or perpendicular to a reflector 108 and the vertical axis 104. The dip angle is computed according to the following equation: β=(θ$_s$+θ$_r$)/2. FIG. 2 is a graph 200 showing of the reflection energy for the dip angle gather associated with the reflector 108 shown in FIG. 1. The graph 200 includes a vertical axis 202 representing a depth (Z) and the horizontal axis 204 representing the dip angle β. Since the dip angle β for a particular reflector is fixed, the reflection energy associated with the particular reflector will focus to one point 206 in dip-angle gather.

Figure 3:
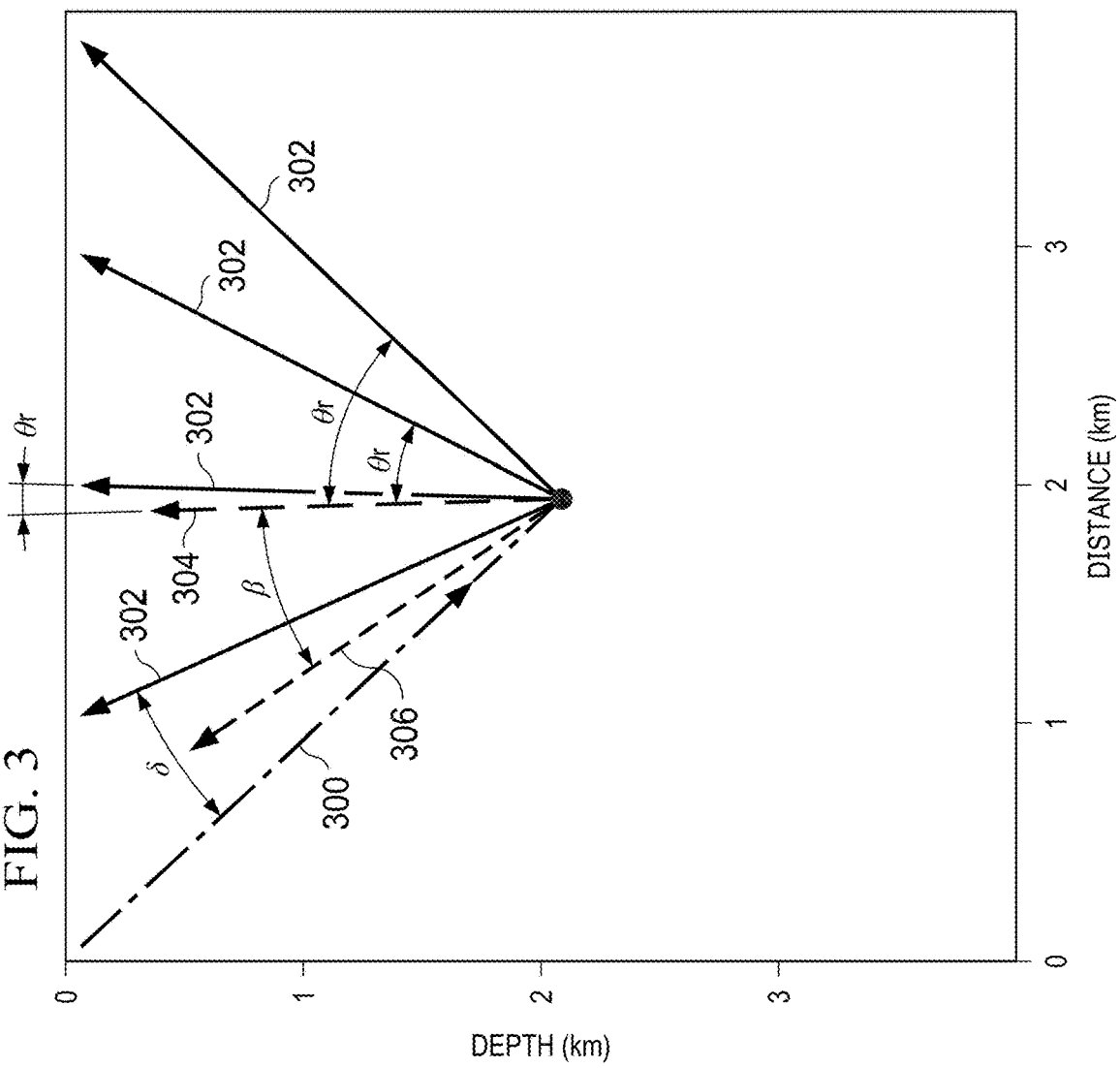
FIG. 3 is a schematic illustration of diffraction energy behavior.
Figure 4:
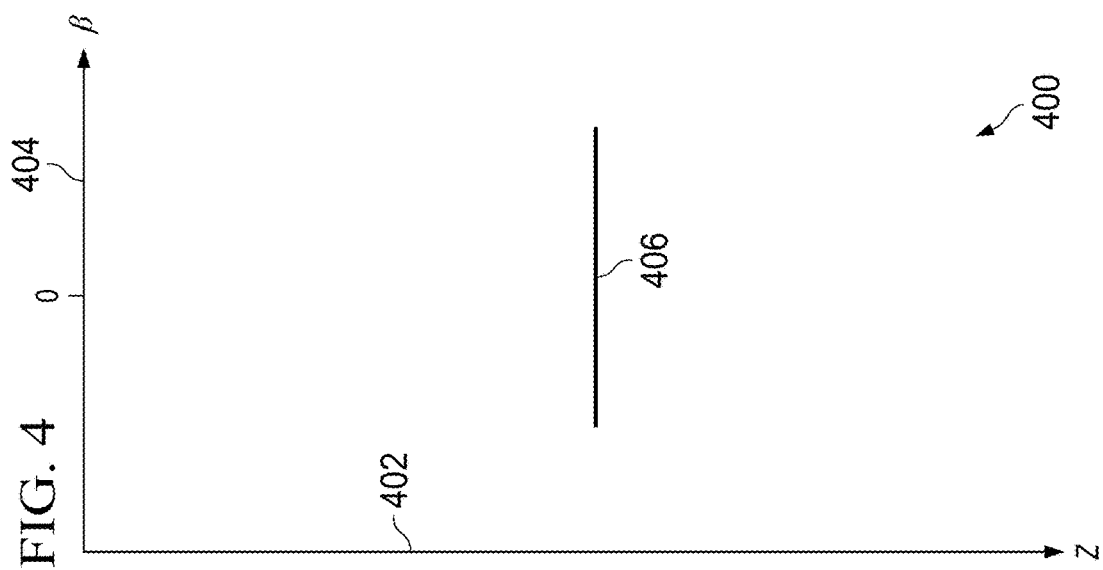
FIG. 4 is an illustration of a diffraction case in a dip-angle gather.

In contrast, for a diffraction case, a plurality of diffracted rays 302 are produced for a given incident ray 300, and the dip angle β of each diffracted ray 302 varies with the angle θ$_r$ of each diffracted ray 302, as shown in FIG. 3. The angle β of each diffracted ray 302 is measured between a line 306 that bisects an angle δ formed between the incident ray 300 and the diffracted ray and a vertical axis 304. Thus, the diffraction energy will spread to form a flat event 406, as shown in the graph 400 of FIG. 4. The graph 400 includes a vertical axis 402 representing a depth and the horizontal axis 404 representing the dip angle β. Using the different patterns produced by diffraction dip-angle gathers and reflection dip-angle gathers, a windowed median filter is usable to extract diffraction energy. A median filter is operable to compute a median value for a vector along a dip angle direction. Using this median value, the reflection energy can be separated from the diffraction energy.

Acoustic wave propagation in a velocity model, v(x, z), can be described by the wave equation:

$$\frac{\partial^2 u(x, z, t)}{\partial^2 x} + \frac{\partial^2 u(x, z, t)}{\partial^2 z} = \frac{1}{v^2(x, z)} \frac{\partial^2 u(x, z, t)}{\partial^2 t} + f(t; x = x_s, z = z_s),$$ (Equation 1)

where u is the seismic wavefields; x and z are the spatial variables; t is time; and f(t) is the source term that is ignited at the location of (x$_s$, z$_s$).

Use of the wave equation to migrate the diffractors improves accuracy of the resulting diffraction image as compared to an image created using a ray-based method but increases computational costs. However, the systems and method of the present disclosure reduce the computational costs by using plane-wave gathers, a recursive Radon transform, and a new pseudo dip-angle gather. The use of these features increases efficiency and reduces costs.

A plane-wave gather is a collection of seismic traces that share a common ray parameter, p. A plane-wave gather is the result of a linear source excitation as opposed to a point source excitation. A plane-wave gather is obtainable by applying a linear radon transform to the common-shot gathers. Compared with a point source, a plane-wave source provides a greater amount of illumination to an area. As a result, fewer plane-wave gathers are used in comparison to common-shot gathers in order to obtain useful diffraction image results. The number of plane-wave gathers used may vary depending, for example, on a complexity of the subsurface structure and the acquisition geometry. By using fewer plane-wave gathers, costs are reduced.

To obtain the plane-wave gathers, a linear Radon transform is applied to the original shot records, u$_r$(x$_s$,t;x$_r$), to generate the associated plane-wave gathers, U$_r$(x$_r$,t;p). The linear Radon transform is shown as follows:

$$U_r(x_r,t;p)=\int u_r(x_s,t+p(x_s-x_0);x_r)dx_s,$$ (Equation 2)

where p is the ray parameter quantified by sin(θ$_0$)/v$_0$; θ$_0$ is the surface incident angle that is measured from a z-axis to an initial direction of plane-wave propagation; v$_0$ is the surface velocity; x$_0$ is the plane-wave origin at the surface; and x$_s$ and x$_r$ are the source and receiver locations, respectively.

The plane-wave gathers are extrapolated by the one-way wave equation in the frequency domain. Shifting the plane-wave gather in time domain is unnecessary, since a time shift is equal to a phase shift in the frequency domain. As a result, computational and memory costs are lowered. The quality of the plane-wave gathers may be affected by the acquisition geometry, and sparse acquisition may lead to artifacts in the resulting plane-wave gathers. Thus, in some instances, interpolation of shot gathers may be performed prior to generating plane-wave gathers.

Figure 5:
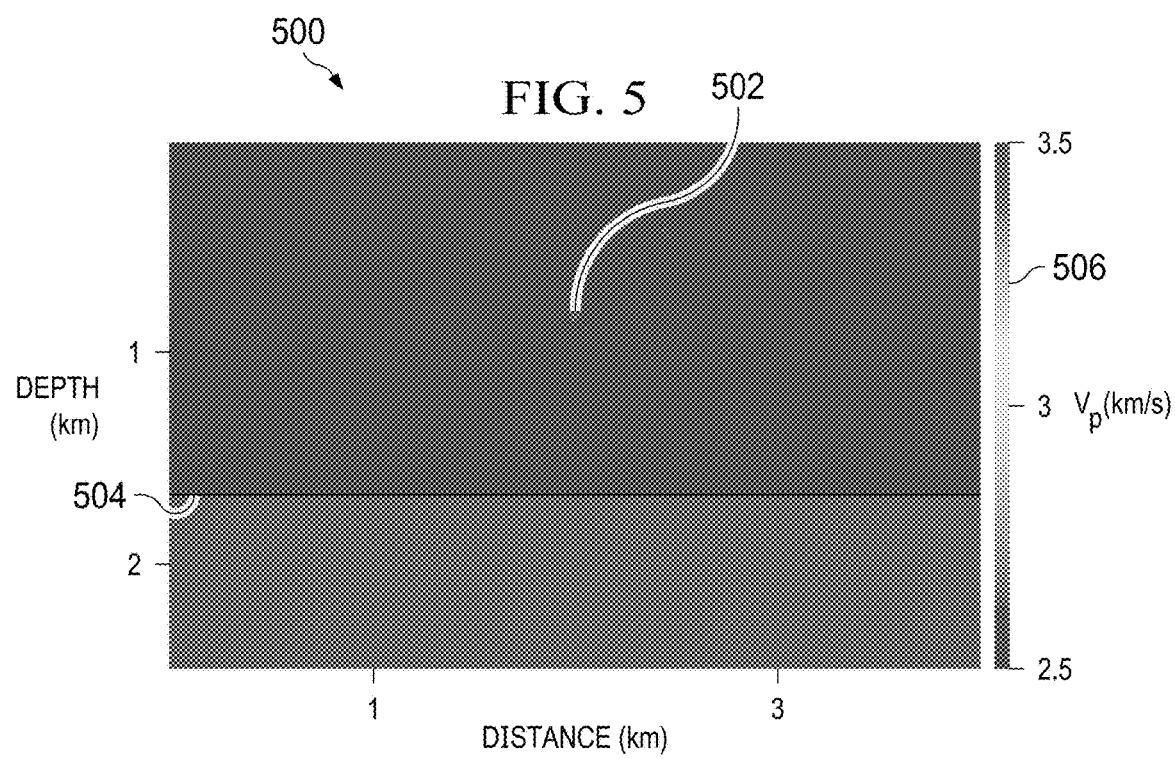
FIG. 5 is a simple velocity model, according to some implementations of the present disclosure.
Figure 6:
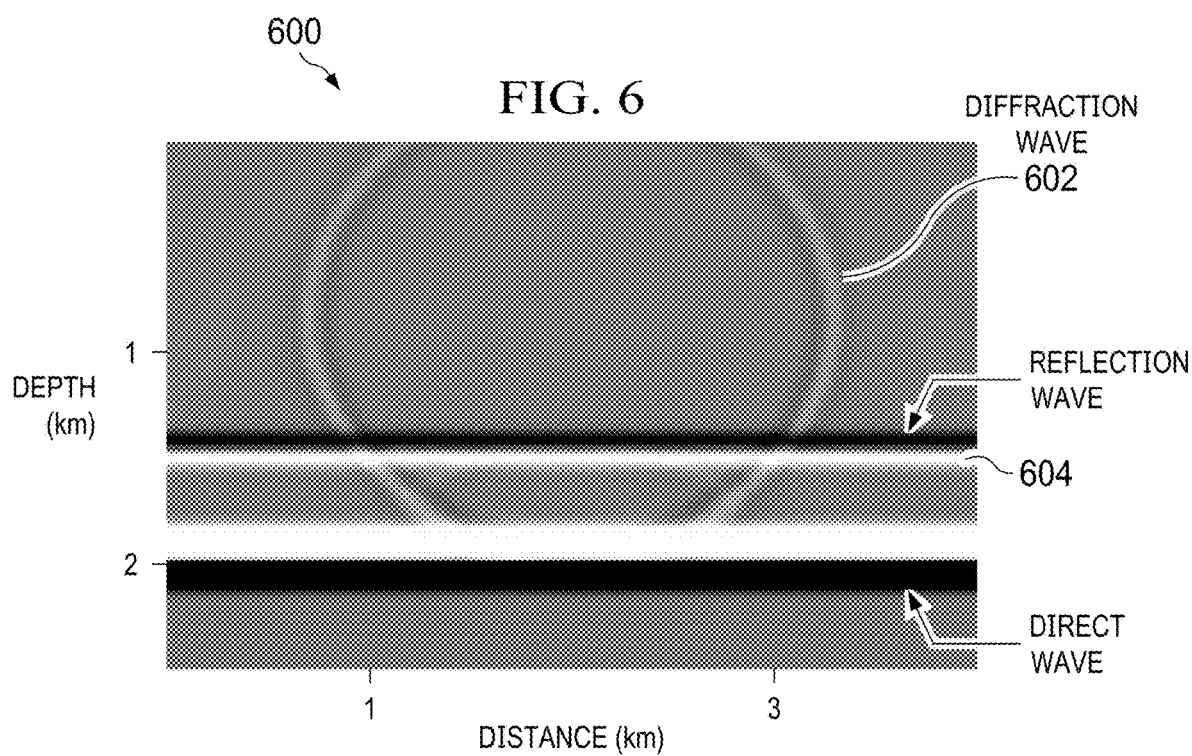
FIG. 6 is a snapshot image of the velocity model of FIG. 5, according to some implementations of the present disclosure.

Use of a plane-wave gather is verified with a simple velocity model. FIG. 5 is a simple velocity model 500 that includes a single diffractor 502 and a single flat reflector 504. The x-axis of FIG. 5 represents a horizontal distance in kilometers (km), and the y-axis of FIG. 5 represents a depth, also in kilometers. A color bar 506 is also shown that indicates velocity in kilometers per second (km/s). FIG. 6 is a 1000 millisecond snapshot for the velocity model 600 of FIG. 5 with 0° plane-wave source. The x-axis of FIG. 6 represents a horizontal distance in kilometers, and the y-axis of FIG. 6 represents a depth, also in kilometers. As clearly shown, the diffraction wave 602 has multi-angle scattering, while the reflection wave 604 has unique-angle reflection. The differences in the nature of the diffraction wave 602 and the reflection wave 604 serve as the basic physics for using plane-wave gathers to separate the diffraction energy from reflection energy.

With the extrapolated plane-wave gathers generated, a recursive Radon transform is used to decompose the receiver-side wavefields of the plane-wave gathers into different components. Decomposition of the source-side wavefields of the plane-wave gathers is unnecessary, as described in more detail later. Decomposition is facilitated by the differences in behavior between diffraction energy and reflection energy, described earlier. A local plane-wave component g(x',τ,p) corresponding to a specific ray parameter p, is computed using the Radon transform. The recursive Radon transform is applied on local data centered at x' with a window length of n, to give the following relationship:

$$g(x', \tau, p) = \int_{x'-\frac{n}{2}}^{x'+\frac{n}{2}} u(x, p(x+x')+\tau)dx,$$ (Equation 3)

where n is the number of points in a user-specified window along the horizontal direction; x' indicates the center of the current window; u(x,t) is the wavefield at every location; and g(x',τ,p) is the resultant Radon-domain data of the x'-th window.

The frequency domain expression of this time-domain recursive Radon transform equation is as follows:

$$G(x', \omega_i, p) = e^{-i\omega_i p x'} \sum_{x=x'-\frac{n}{2}}^{x=x'+\frac{n}{2}} U(\omega_i, x) e^{-i\omega_i p x},$$ (Equation 4)

where $\omega_i$ is the angular temporal frequency and U is the space-frequency-domain wavefields.

Figure 7:
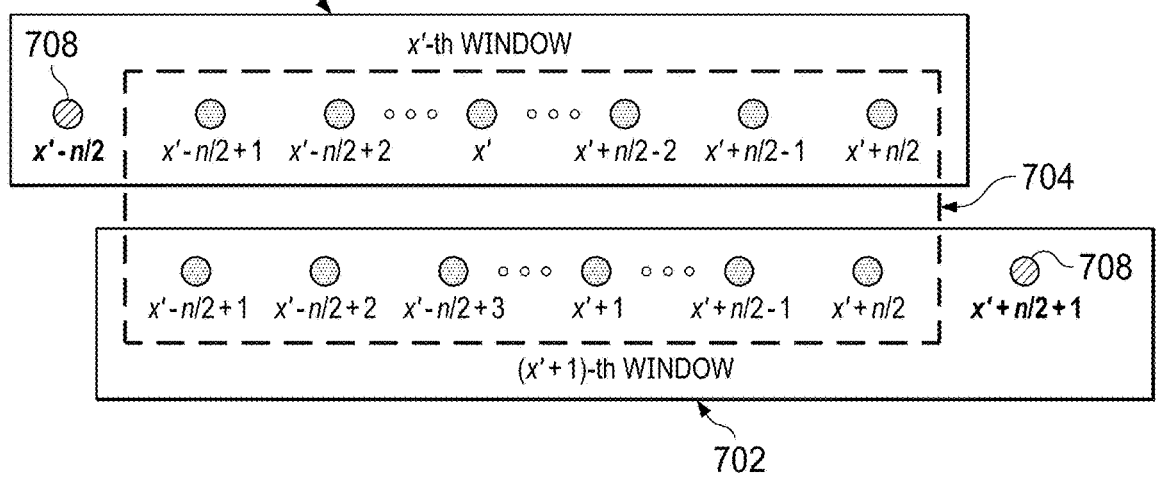
FIG. 7 is a schematic diagram illustrating a windowing aspect of the recursive local Radon transform, according to some implementations of the present disclosure.

FIG. 7 is a schematic diagram illustrating a windowing aspect of the recursive local Radon transform. Rectangles represent two consecutive windows 700 and 702. A rectangle 704 denotes points shared by these two windows 700 and 702 that are not involved in computation for a new window. Thus, points 708 lying outside of the rectangle 704 are the points for which calculation is performed when calculating the Radon transform of a next, new window. As shown in FIG. 7, the x'-th window 700 containing the points from x'−n/2 to x'+n/2 adjoin (x'+1)-th window 702 with points ranging from x'−n/2+1 to x'+n/2+1. The points contained within the rectangle 704 are shared by these two windows 700 and 704. Therefore, computation of the Radon transform of a next (x'+1)-th window involves removal of the contribution of x'−n/2 point and inclusion of the point of x'+n/2+1. Thus, processing the recursive Radon transform involves two complex multiplications and two complex additions to complete the Radon transform of a next new window. As a result, the recursive Radon transform uses fewer computational resources and enjoys enhanced efficiency.

The recursive computation associated with the recursive Radon transform includes an imaging function. The imaging function is described in more detail later in the context of Equations 5-8. In some implementations, a phase shift plus interpolation (PSPI) imaging function may be used. Because the wavefields are in the frequency domain, PSPI may be used. In other implementations, other imaging functions, such as reverse time migration method, split-step Fourier method, Phase shift method, or Fourier finite-difference method, may be used.

As indicated earlier, the decomposed receiver-side wavefields G (x',$\omega_i$,p) produced by the recursive Radon transform are a function of the ray parameter p. The decomposed wavefields G(x',$\omega_i$,p) are transformed into a form that is a function of propagation angle θ. The decomposed wavefields are converted into G(x',$\omega_i$,θ) using the relationship p=sin(θ)/v.

According to the present disclosure, diffraction images are obtained by generating plane-wave gathers; extrapolating the plane-wave gathers and plane-wave sources simultaneously to produce corresponding receiver-side and source-side wavefields; decomposing the receiver-side wavefields and source-side wavefields into different components with different propagation angles, respectively; and applying an image condition to the receiver-side and source-side wavefields to create a normal dip-angle gather. This imaging function is accomplished, in part, using the following equations:

$$I'(x,z,\beta';p) = \int S(x,z,\omega,\theta_s;p)R(x,z,\omega,\theta_r;p)d\omega,$$ (Equation 5)

$$\beta' = (\theta_r - \theta_s)/2,$$ (Equation 6)

where I(x,z,β';p) is the normal dip-angle gather and S(x,z,ω,$\theta_s$;p) and R(x,z,ω,$\theta_r$;p) are the decomposed plane-wave source-side and receiver-side wavefields at propagation angle $\theta_s$ and $\theta_r$, respectively. The decomposed wavefields G(x',$\omega_i$,θ) are the decomposed plane-wave source-side wavefields and receiver-side wavefields.

However, obtaining a dip-angle gather in this instance can be simplified, thereby increasing efficiency and reducing computational resources. The key to separating diffraction energy from reflection energy is recognizing that each of the diffraction energy and reflection energy expresses a different pattern in the dip-angle gather. Therefore, for a gather in which the reflection energy forms focused events and the diffraction energy forms flat events, extraction of the diffraction energy is possible. Further, it is recognized that multi-angle scattering occurs in the receiver-side wavefields and not in the source-side wavefields. Therefore, decomposition of the source-side wavefields is unnecessary.

In light of these observations, a surface incident angle of one plane-wave gather is set equal to a subsurface incident angle of associated source-side wavefields, and the receiver-side wavefields are decomposed by the recursive Radon transform. A pseudo dip-angle gather I(x, z, β; p) is generated using the following equations:

$$I(x,z,\beta;p) = \int S(x,z,\omega;p)R(x,z,\omega_r;p)d\omega,$$ (Equation 7)

$$\beta = (\theta_r - \theta'_s)/2,$$ (Equation 8)

where S(x, z, ω; p) represents the extrapolated plane-wave source-side wavefields at spatial location (x, z) with the ray parameter p and frequency ω; R(x,z,ω, $\theta_r$;p) represents the decomposed plane-wave receiver-side wavefields obtained using the recursive Radon transform of Equation 4, described earlier; $\theta'_s$ is the surface incident angle of the associated plane-wave gather which is used as the propagation angle for source-side wavefields at all the subsurface image points; the frequency ω range covers the main energy of the seismic data; and β is the pseudo dip-angle. The main energy means most of the energy of the seismic data.

It is noted that these simplifications are accurate for homogenous media and have less applicability to complex subterranean structures. However, even where the subterranean structures are complex, this simplified approach merely affects a resulting horizontal position of the focused reflection energy in dip-angle gather. In other words, in cases of complex subterranean structures, the reflection energy in the pseudo dip-angle gather is still expressed as a focused point but may include an incorrect dip-angle position, and the diffraction energy remains expressed as flat events. Thus, the pseudo dip-angle gather may vary from a normal dip-angle gather in that the dip angle associated with the pseudo dip-angle gather may not be equal to the dip angle associated with the normal dip-angle gather.

Efficiency of this approach is improved for several reasons. For example, the fewer plane-wave gathers are used (as compared to the number of shots conventionally used) and the recursive Radon transform provides improved efficiency over conventional methods. Additionally, a pseudo dip-angle gather eliminates the additional operation of decomposing the source-side wavefields and maintains the diffraction energy and reflection energy in respective patterns that are similar to patterns associated with diffraction energy and reflection energy in a normal dip-angle gather.

With the pseudo dip-angle gather created as described earlier, the diffraction energy is extracted. As explained earlier, in the pseudo dip-angle gather, the diffraction energy is expressed in flat events and the reflection energy is expressed in focused point events. These different patterns of expression allow for the removal of the reflection energy with the use of a windowed median filter. The windowed median filter function is given by:

$$I_d(x,z;p) = \frac{\sum_{i=0}^{n_w} M_{\beta \in [m_i-\delta\beta, m_i+\delta\beta]}[I(x,z,\beta;p)]}{\sum_{\beta} |I(x,z,\beta;p)| + \varepsilon},\quad \text{(Equation 9)}$$

where $I_d$ is the diffraction image, $n_w$ is the number of sliding windows, $m_i$ is the middle point of the i-th window, $\delta\beta$ is the half window length, $\varepsilon$ is the stabilization term and $M_\beta$ denotes the median filter operator applied along the pseudo dip angle direction within the range of $[m_i-\delta\beta, m_i+\delta\beta]$. The denominator term of summing all of the dips is exploited to balance the contrast between reflection and diffraction energy in pseudo dip-angle gathers. With the diffraction energy data now separated from the reflection energy data, diffraction images may be generated. Various known methods may be used to generate the diffraction images using the separated diffraction energy data.

A size of the window used in the windowed median filter may affect a quality of the resulting diffraction image. A size of the window may be varied in order to optimize a resulting diffraction image. A resulting diffraction image may be optimized when a result meets or is within a predefined threshold. With a pseudo dip-angle gather obtained, an initial window size may be selected based on an angle coverage range of the reflection energy.

Figure 8:
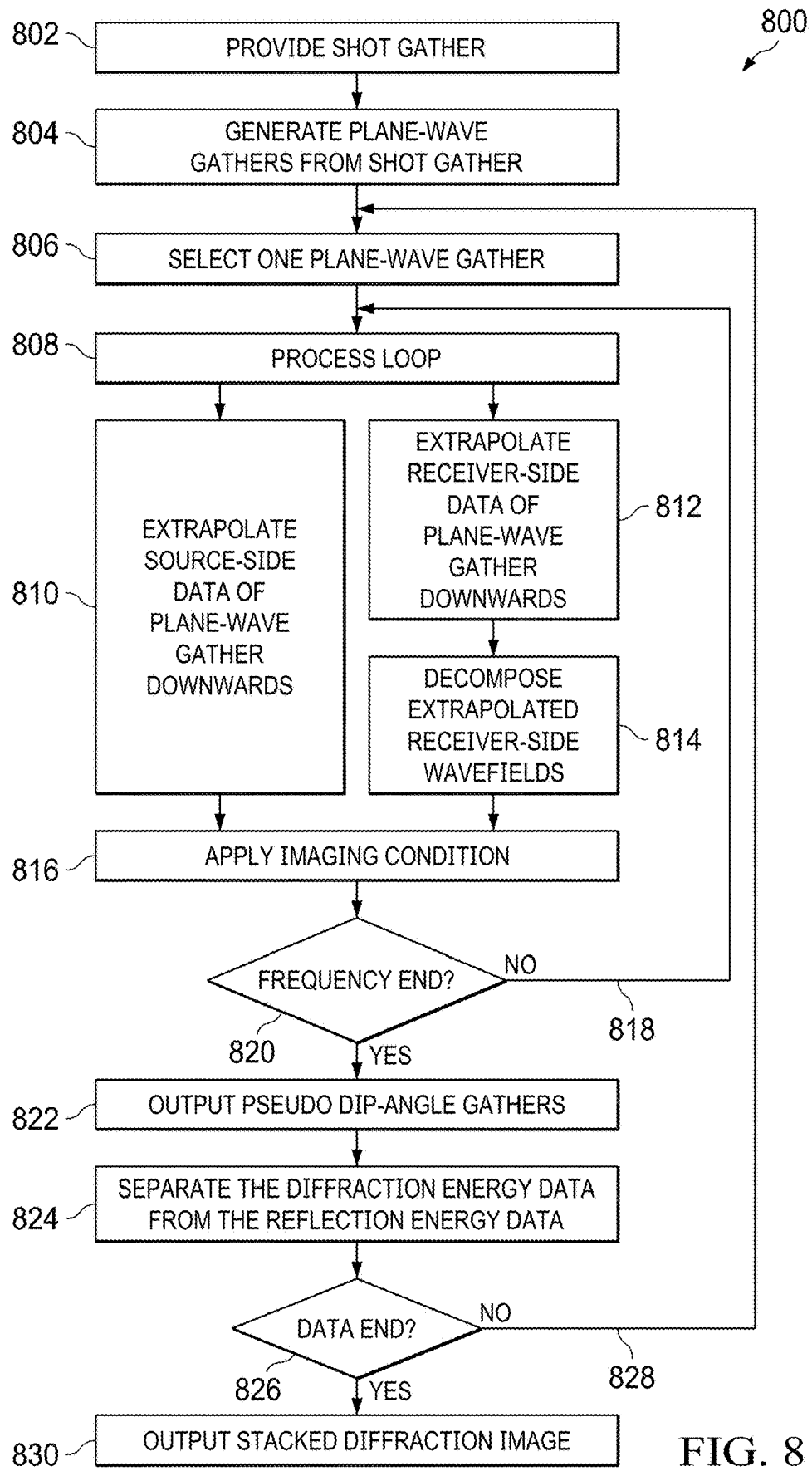
FIG. 8 is a flowchart of an example method of generating diffraction images from seismic shot records, according to some implementations of the present disclosure.

FIG. 8 is a flowchart of an example method 800 of generating diffraction images from seismic shot records. At 802, a shot gather formed from a plurality of shots is provided. At 804, the input shot gather is converted into one or more plane-wave gathers. For example, the shot gather may be converted into one or more plane-wave gathers using a linear Radon transform, such as the linear Radon transform described earlier and provided as Equation 2. With the plane-wave gathers generated, each of the plane-wave gathers is decomposed. At 806, one of the plane-wave gathers is selected, and, at 808, the selected plane-wave gather begins an extrapolation and decomposition process loop. In some implementations, the extrapolation is performed using the one-way wave equation and decomposition process is a recursive Radon transform, as described earlier. At 810, source-side wavefields of the plane-wave gathers are extrapolated downward, but decomposition of these data is not necessary because, as explained earlier, multi-angle scattering does not occur in the source side wavefields. A downwards extrapolation means extrapolation from the surface to the subsurface. In some implementations, source-side data of the plane-wave gathers may be extrapolated using an acoustic wave equation, such as the acoustic wave equitation represented as Equation 1. At 812, the receiver-side data are extrapolated downward. Again, an acoustic wave equation, such as that shown represented as Equation 1, may be used to extrapolate the receiver-side data. At 814, the extrapolated receiver-side wavefields are decomposed into different components with different incident angles. In some implementations, a recursive Radon transform is used to decompose the extrapolated receiver-side wavefields into different components. It is noted that the extrapolation of the source-side wavefields and the extrapolation and decomposition of the receiver-side wavefields occurs simultaneously.

At 816, an imaging condition is applied to the extrapolated and decomposed wavefields. As explained earlier, a variety of imaging methods may be used. For example, PSPI, reverse time migration, split-step Fourier method, and Phase shift method, Fourier finite-difference method are but a few examples that may also be used. At 820, a determination is made as to whether all of the frequencies with in the frequency range of the data have been processed. If the answer is "no," meaning some frequencies have yet to be processed, the recursive loop, represented by 818, begins. A number of times that the recursive loop is repeated depends on the frequency range of the data. When the recursive loop 818 has completed, that is when an entirety of the frequency range of the data have been processed by the recursive loop, the answer to the determination at 820 is "yes," and a pseudo dip-angle gather is completed and outputted at 822. At 824, a windowed median filter is applied to the pseudo dip-angle gather in order to extract the diffraction energy data from the reflection energy data. At 826, a determination is made as to whether all of the plane-wave gathers have been processed. If the answer is "no," additional plane-wave gathers exist. As a result, the method 800 returns to 806 where another of the plane-wave gathers is selected and loop 828 repeats for this next plane-wave gather. Alternatively, if it is determined at 826 that all of the plane-wave gathers have been processed, the determination is that, yes, the data are at an end. The method 800 then continues to 830 where an output stacked diffraction image is outputted. A stacked image is produced where the image data are obtained from a combined group of plane-wave gathers.

An example application of the method of FIG. 8 is described. In this example, the method of FIG. 8 is applied to a synthetic dataset of a partial Marmousi model shown 900 in FIG. 9. The x-axis of the illustrated Marmousi model represents a horizontal distance and is in kilometers. The y-axis is represents depth and is also in kilometers. A color bar 902 represents velocity and is given in kilometers per second. The example includes a 225 common-shot gather with a Ricker wavelet having a 16 hertz (Hz) peak frequency is generated with a two-dimensional acoustic finite-difference method. The shots span uniformly from 0.02 kilometers to 9 kilometers with a spacing of 40 meters. Receiver arrays are fixed for each shot record and cover a measurement area at a spacing of ten meters. The common-shot gather is converted into ten plane-wave gathers with a surface incident angle ranging from −30° to 30°. A pseudo dip-angle gather is generated for every plane-wave gather.

Figure 10:
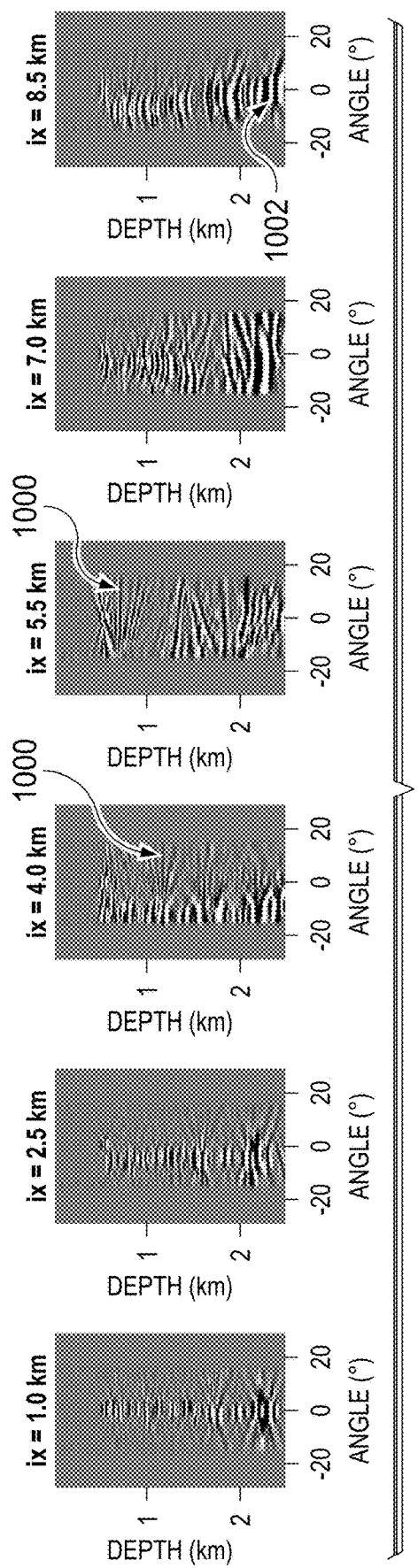
FIG. 10 is an example pseudo dip-angle gather for a plane-wave gather with a 0° surface incident angle, according to some implementations of the present disclosure.
Figure 11:
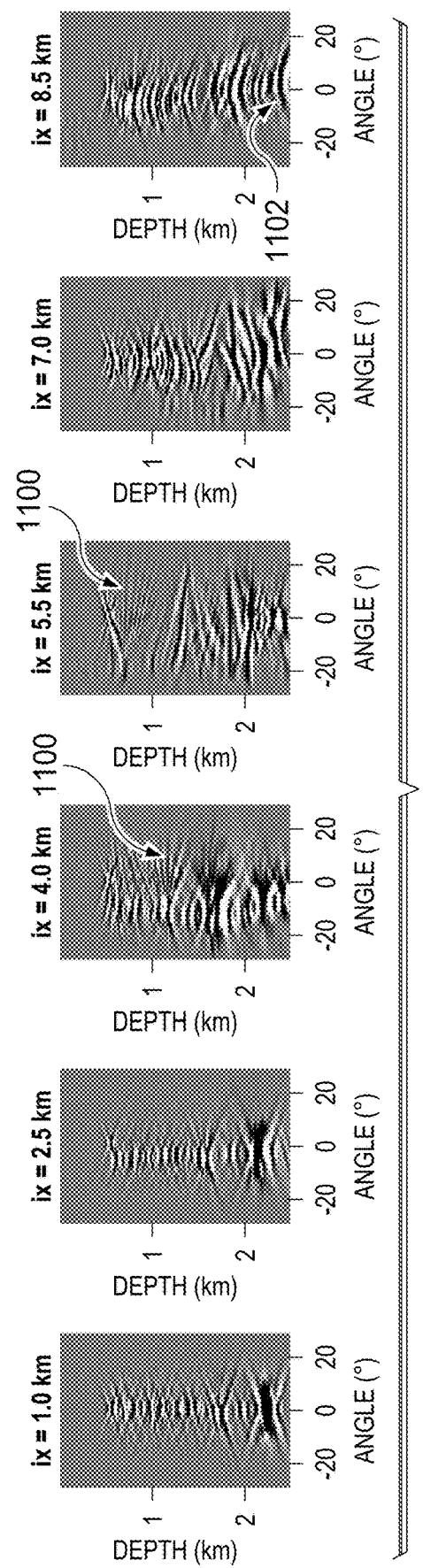
FIG. 11 is an example normal dip-angle gather for a plane wave-gather with a 0° surface incident angle.

FIGS. 10 and 11 show plots for a pseudo dip-angle gather and a normal dip-angle gather, respectively, over a shot span that extends uniformly over a span of nine kilometers with a shot spacing of 40 meters (m). FIG. 10 shows pseudo dip-angle gather plots at 1.0 km, 2.5 km, 4.0 km, 5.5 km, 7.0 km, and 8.5 km along the shot. Similar to FIG. 10, the plots shown in FIG. 11 are taken at 1.0 km, 2.5 km, 4.0 km, 5.5 km, 7.0 km, and 8.5 km along the shot. FIG. 10 is a pseudo dip-angle gather for a plane-wave gather with a 0° surface incident angle. A corresponding normal dip-angle gather having a 0° surface incident angle is shown in FIG. 11. The normal dip-angle gather is obtained by applying the recursive Radon transform on both source- and receiver-side wavefields. Specifically, normal dip-angle gather $I'(x,z,\beta';p)$ is generated by using the following equations:

$$I'(x,z,\beta';p) = S(x,z,\omega,\theta_s;p)R(x,z,\omega\theta_r;p)d\omega, \quad \text{(Equation 10)}$$

$$\beta' = (\theta_s + \theta_r)/2, \quad \text{(Equation 11)}$$

where $S(x,z,\omega, \theta_s;p)$, similar to $R(x,z,\omega,\theta_r;p)$, represents the decomposed plane-wave source-side wavefields at propagation angle $\theta_s$, which is obtained by applying Equation 7 to the extrapolated source-side wavefields; and $\beta'$ is the normal dip angle.

As expected, FIGS. 10 and 11 show that the reflection energy is revealed in both pseudo dip-angle gathers and normal dip-angle gathers with the pattern of flat events indicated by arrows 1000 and 1100, respectively. Further, the reflection in the pseudo dip-angle gather is still the focused energy, and the focusing location is horizontally shifted compared with the normal dip-angle gather, identified by arrows 1002 and 1102, respectively. Therefore, the pseudo dip-angle gather is sufficient to extract diffraction energy, because the pseudo dip-angle gather generates the correct pattern for diffraction and reflection energy.

Figure 9:
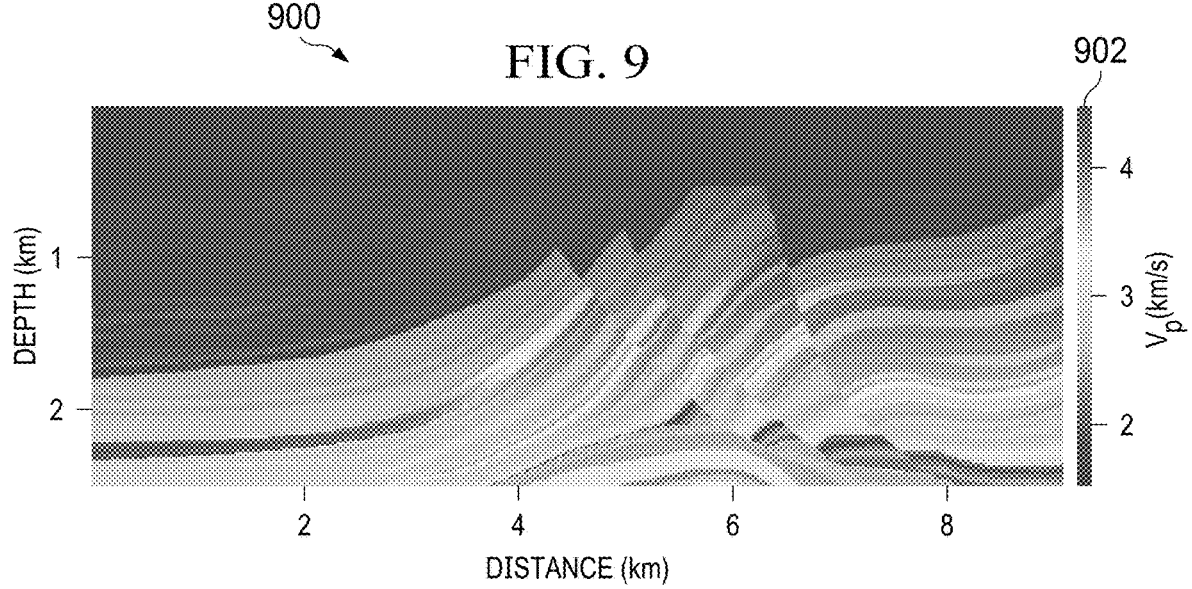
FIG. 9 is an image of a synthetic dataset of a partial Marmousi model.
Figure 12:
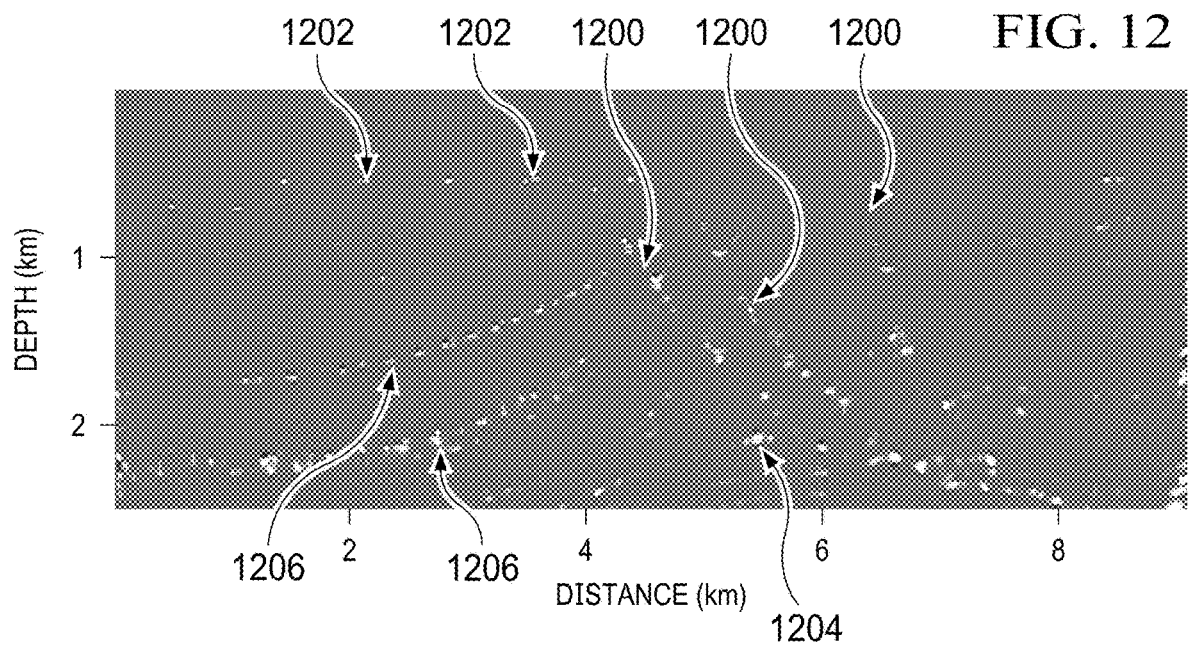
FIG. 12 is an example final diffraction image, according to some implementations of the present disclosure.

To further illustrate this capability, a median filter, as described earlier, is applied to each pseudo dip-angle gather (where each pseudo dip-angle gather is obtained from a corresponding plane-wave gather) to generate an associated diffraction image. Plane-wave gathers with different surface incident angles have different subsurface illumination. Thus, the outputs are stacked from the ten pseudo dip-angle gathers to generate the final diffraction image, shown in FIG. 12. FIG. 12 shows three major faults 1200, pinchouts 1202 and some local velocity discontinuities 1204 are clearly revealed. Additionally, some diffractors, such as the diffractors 1206, while scarcely visible in the velocity model of FIG. 9, are well-captured in the diffraction image of FIG. 12. This indicates that the diffraction image has a resolution sufficient for revealing small-scale heterogeneities.

To verify the efficiency of the proposed method, the elapsed times for generating the pseudo dip-angle gather and normal dip-angle gather are compared using the same parameters. That is, the ten plane-wave gathers and a recursive Radon transform are used to generate both the pseudo dip-angle gather and normal dip-angle gather. A pseudo dip-angle gather was generated in an elapsed time of 9.4 minutes, while a normal dip-angle gather was generated in an elapsed time of 41.2 minutes.

The present disclosure is also applicable to marine data sets. In another example, the method of FIG. 8 is applied to a two-dimensional marine data set. This data set includes 1,457 shots with a recording length of ten seconds and a time sampling interval of two milliseconds. The maximum source-receiver offset is 8 kilometers. Prior to imaging the data, surface-consistent scaling, bandpass filtering, and F-K filtering is applied to the imaging data to remove ambient noise, anomalous amplitude, and surface waves. An F-K filter filters input data in a frequency-wavenumber domain. Additionally, the data are transformed from three dimensions to two dimensions by applying the filter $\sqrt{i\omega}$ in the frequency domain. Refraction energy is removed from the original data.

Figure 13:
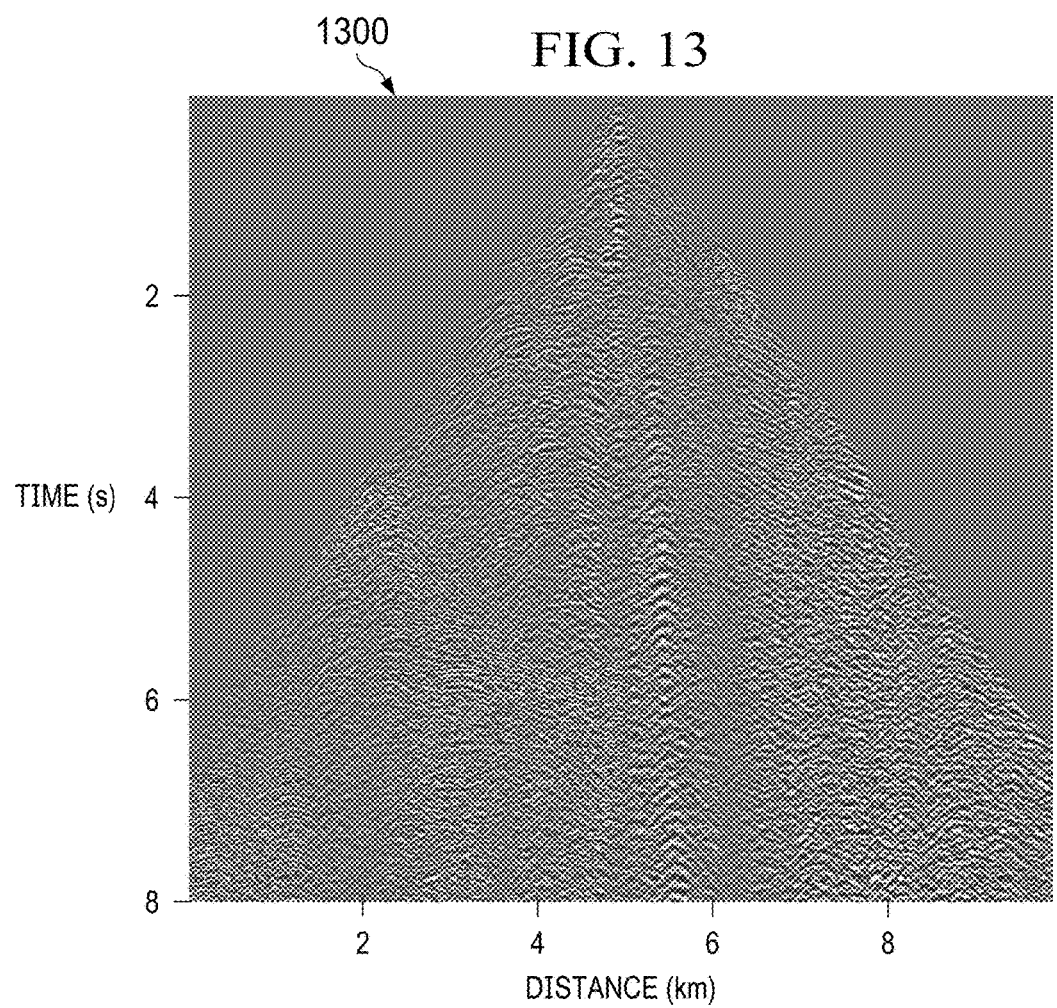
FIG. 13 is a representative common-shot gather obtained after application of surface-consistent scaling, bandpass filtering, and FK filtering, according to some implementations of the present disclosure.
Figure 14:
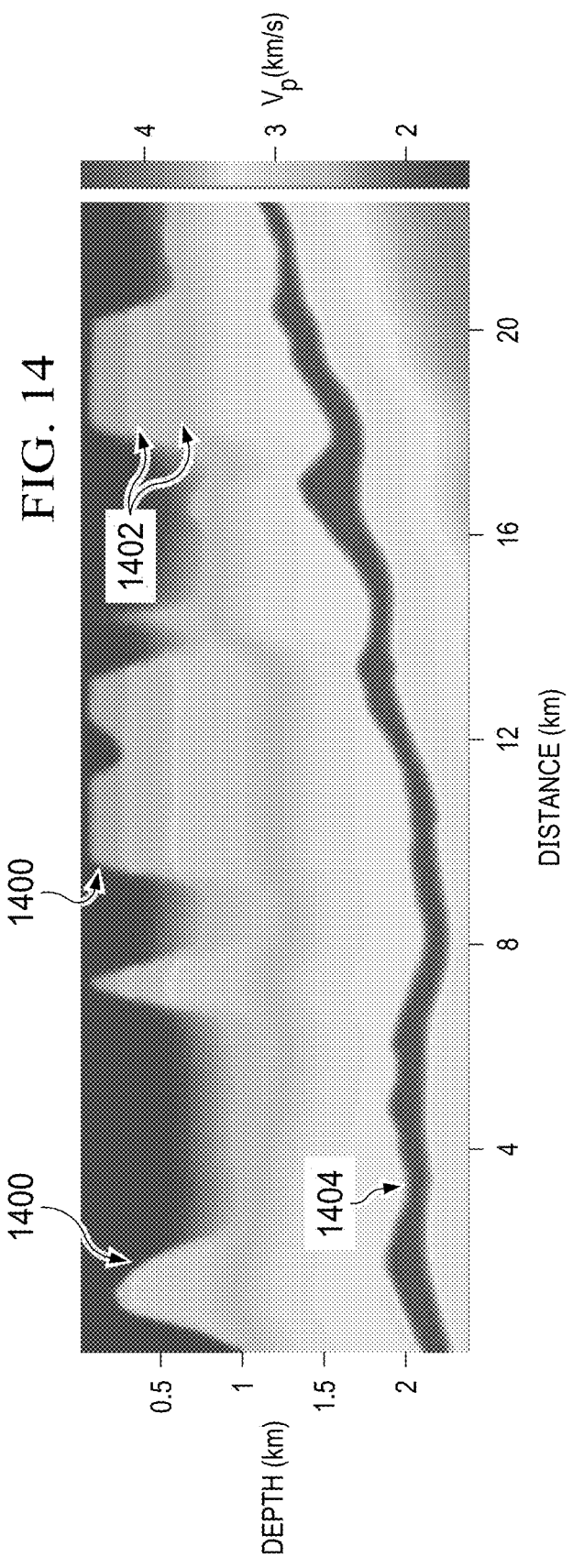
FIG. 14 is a partial migration velocity model constructed using migration velocity analysis and interpretation-based methods, according to some implementations of the present disclosure.

FIG. 13 is a representative common-shot gather 1300 obtained after the earlier-described processing is conducted. FIG. 14 is a partial migration velocity model constructed using migration velocity analysis and interpretation-based methods. The horizontal and vertical intervals of the velocity model are 12.5 meters and 4.0 meters, respectively. The model of FIG. 14 shows a rough ocean bottom 1400 and sedimentary layers 1402 that are embedded with a thin salt body 1404.

The plane-wave number $n_p$ for conventional migration satisfies the plane-wave sampling principal shown in Equation 12:

$$n_p \geq \frac{n_s \Delta x_s f(\sin\theta_2 - \sin\theta_1)}{v_0}, \quad \text{(Equation 12)}$$

where $n_s$ is the number of the shot records, f is the peak frequency of the seismic data, $\theta_1$ and $\theta_2$ are the minimum and maximum surface incident angle, and $v_0$ is the surface velocity. However, since the median filter applied to the pseudo dip-angle gather removes most of the non-flat events and because patterns associated with artifacts are unlikely to be flat events, fewer plane-wave gathers may be used compared to a number of plane-wave gathers used for the sampling principle for imaging diffractors.

Figure 15:
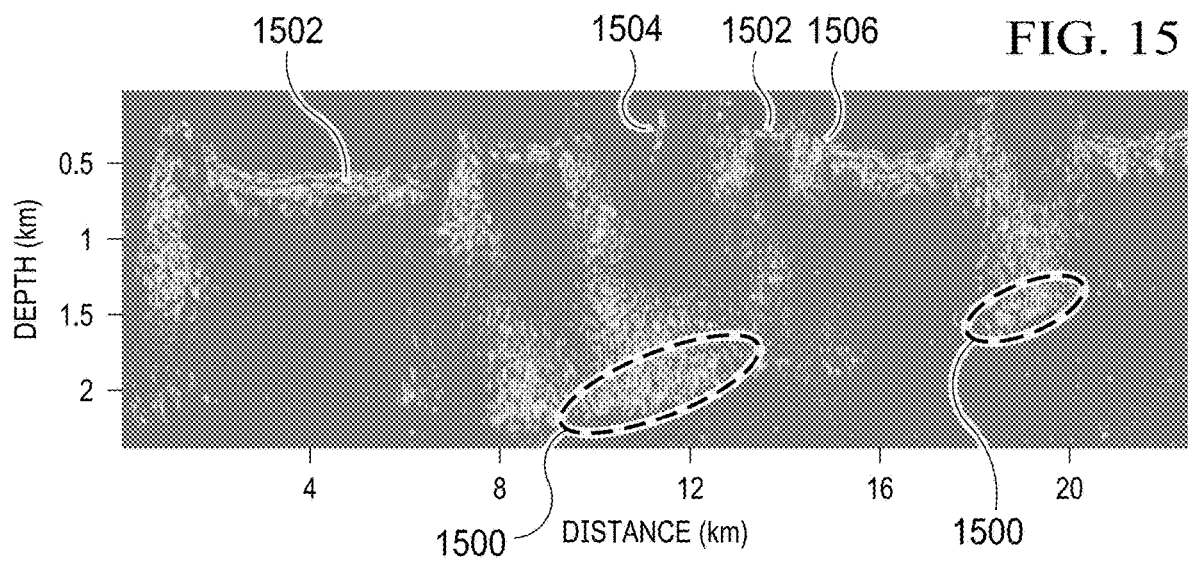
FIG. 15 is an example stacked diffraction image using the windowed median filter, according to some implementations of the present disclosure.

In this example, the processed shot records are converted to 100 plane-wave gathers covering the surface incident angle from −68° to 68°. The algorithm represented by FIG. 8 is then applied using frequencies from one hertz to 51 hertz with a source of a delta function, and 100 associated pseudo dip-angle gathers are generated. The pseudo dip-angle spans from −70° to 70° with a sampling rate of 3.5°. FIG. 15 is the stacked diffraction image using the windowed median filter with a window size of 40 grid points. As shown, strong continuous reflector events are removed from the image of FIG. 15.

Figure 16:
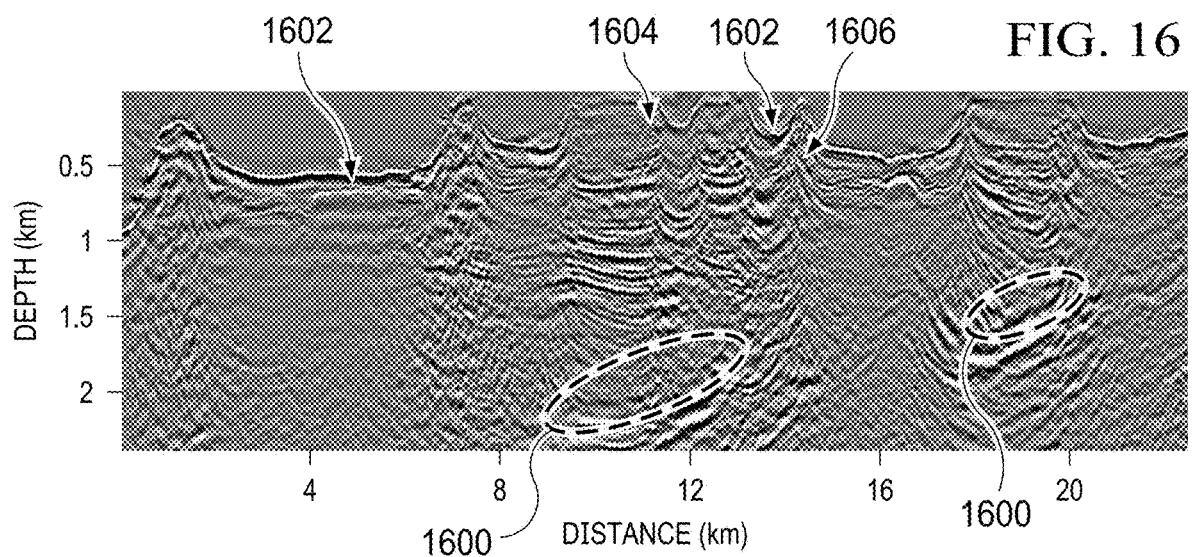
FIG. 16 is an example conventional depth domain migrated image.

FIG. 16 is a conventional migrated image. Ellipses 1500 in the diffraction image of FIG. 15 identify pinch-outs zones between sedimentary layers and a rim of the salt body, which is also verified in the migrated image of FIG. 16. FIG. 15 shows pinch-outs (located within the ellipses 1500), discontinuities 1502, a possible fault 1504, and a possible fracture zone 1506. As is shown in FIG. 16, a dip of the sedimentary layers 1600 is not consistent with a dip normally associated with a salt body. Discontinuities 1602 are denoted along the reflectors. The diffraction image of FIG. 16 also reveals a possible fault 1604 and possible fracture zone 1606. The fault 1604 and possible fracture zone 1606 are difficult to identify using only the conventional migrated image of FIG. 16. The diffraction image of FIG. 15, however, provides a helpful crosscheck. In summary, the synthetic and field data tests validate that pseudo dip-angle gathers to provide an accurate depth-domain diffraction image.

Figure 17:
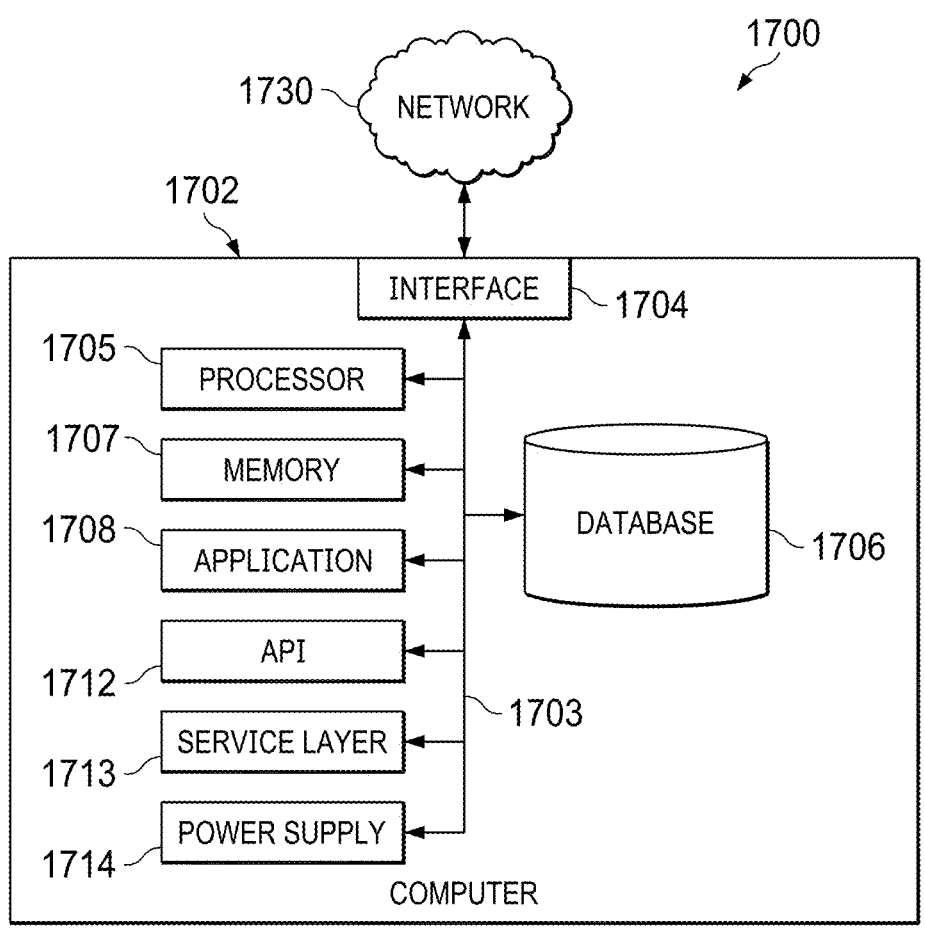
FIG. 17 is a block diagram illustrating an example computer system used to provide computational functionalities associated with described algorithms, methods, functions, processes, flows, and procedures, as described in the present disclosure, according to some implementations of the present disclosure.

FIG. 17 is a block diagram of an example computer system 1700 used to provide computational functionalities associated with described algorithms, methods, functions, processes, flows, and procedures described in the present disclosure, according to some implementations of the present disclosure. The illustrated computer 1702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1702 can include input devices such as keypads, keyboards, and touch screens that can accept user information. Also, the computer 1702 can include output devices that can convey information associated with the operation of the computer 1702. The information can include digital data, visual data, audio information, or a combination of information. The information can be presented in a graphical user interface (UI) (or GUI).

The computer 1702 can serve in a role as a client, a network component, a server, a database, a persistency, or components of a computer system for performing the subject matter described in the present disclosure. The illustrated computer 1702 is communicably coupled with a network 1730. In some implementations, one or more components of the computer 1702 can be configured to operate within different environments, including cloud-computing-based environments, local environments, global environments, and combinations of environments.

At a high level, the computer 1702 is an electronic computing device operable to receive, transmit, process, store, and manage data and information associated with the described subject matter. According to some implementations, the computer 1702 can also include, or be communicably coupled with, an application server, an email server, a web server, a caching server, a streaming data server, or a combination of servers.

The computer 1702 can receive requests over network 1730 from a client application (for example, executing on another computer 1702). The computer 1702 can respond to the received requests by processing the received requests using software applications. Requests can also be sent to the computer 1702 from internal users (for example, from a command console), external (or third) parties, automated applications, entities, individuals, systems, and computers.

Each of the components of the computer 1702 can communicate using a system bus 1703. In some implementations, any or all of the components of the computer 1702, including hardware or software components, can interface with each other or the interface 1704 (or a combination of both), over the system bus 1703. Interfaces can use an application programming interface (API) 1712, a service layer 1713, or a combination of the API 1712 and service layer 1713. The API 1712 can include specifications for routines, data structures, and object classes. The API 1712 can be either computer-language independent or dependent. The API 1712 can refer to a complete interface, a single function, or a set of APIs.

The service layer 1713 can provide software services to the computer 1702 and other components (whether illustrated or not) that are communicably coupled to the computer 1702. The functionality of the computer 1702 can be accessible for all service consumers using this service layer. Software services, such as those provided by the service layer 1713, can provide reusable, defined functionalities through a defined interface. For example, the interface can be software written in JAVA, C++, or a language providing data in extensible markup language (XML) format. While illustrated as an integrated component of the computer 1702, in alternative implementations, the API 1712 or the service layer 1713 can be stand-alone components in relation to other components of the computer 1702 and other components communicably coupled to the computer 1702. Moreover, any or all parts of the API 1712 or the service layer 1713 can be implemented as child or sub-modules of another software module, enterprise application, or hardware module without departing from the scope of the present disclosure.

The computer 1702 includes an interface 1704. Although illustrated as a single interface 1704 in FIG. 17, two or more interfaces 1704 can be used according to particular needs, desires, or particular implementations of the computer 1702 and the described functionality. The interface 1704 can be used by the computer 1702 for communicating with other systems that are connected to the network 1730 (whether illustrated or not) in a distributed environment. Generally, the interface 1704 can include, or be implemented using, logic encoded in software or hardware (or a combination of software and hardware) operable to communicate with the network 1730. More specifically, the interface 1704 can include software supporting one or more communication protocols associated with communications. As such, the network 1730 or the interface's hardware can be operable to communicate physical signals within and outside of the illustrated computer 1702.

The computer 1702 includes a processor 1705. Although illustrated as a single processor 1705 in FIG. 17, two or more processors 1705 can be used according to particular needs, desires, or particular implementations of the computer 1702 and the described functionality. Generally, the processor 1705 can execute instructions and can manipulate data to perform the operations of the computer 1702, including operations using algorithms, methods, functions, processes, flows, and procedures as described in the present disclosure.

The computer 1702 also includes a database 1706 that can hold data for the computer 1702 and other components connected to the network 1730 (whether illustrated or not). For example, database 1706 can be an in-memory, conventional, or a database storing data consistent with the present disclosure. In some implementations, database 1706 can be a combination of two or more different database types (for example, hybrid in-memory and conventional databases) according to particular needs, desires, or particular implementations of the computer 1702 and the described functionality. Although illustrated as a single database 1706 in FIG. 17, two or more databases (of the same, different, or combination of types) can be used according to particular needs, desires, or particular implementations of the computer 1702 and the described functionality. While database 1706 is illustrated as an internal component of the computer 1702, in alternative implementations, database 1706 can be external to the computer 1702.

The computer 1702 also includes a memory 1707 that can hold data for the computer 1702 or a combination of components connected to the network 1730 (whether illustrated or not). Memory 1707 can store any data consistent with the present disclosure. In some implementations, memory 1707 can be a combination of two or more different types of memory (for example, a combination of semiconductor and magnetic storage) according to particular needs, desires, or particular implementations of the computer 1702 and the described functionality. Although illustrated as a single memory 1707 in FIG. 17, two or more memories 1707 (of the same, different, or combination of types) can be used according to particular needs, desires, or particular implementations of the computer 1702 and the described functionality. While memory 1707 is illustrated as an internal component of the computer 1702, in alternative implementations, memory 1707 can be external to the computer 1702.

The application 1708 can be an algorithmic software engine providing functionality according to particular needs, desires, or particular implementations of the computer 1702 and the described functionality. For example, application 1708 can serve as one or more components, modules, or applications. Further, although illustrated as a single application 1708, the application 1708 can be implemented as multiple applications 1708 on the computer 1702. In addition, although illustrated as internal to the computer 1702, in alternative implementations, the application 1708 can be external to the computer 1702.

The computer 1702 can also include a power supply 1714. The power supply 1714 can include a rechargeable or non-rechargeable battery that can be configured to be either user- or non-user-replaceable. In some implementations, the power supply 1714 can include power-conversion and management circuits, including recharging, standby, and power management functionalities. In some implementations, the power-supply 1714 can include a power plug to allow the computer 1702 to be plugged into a wall socket or a power source to, for example, power the computer 1702 or recharge a rechargeable battery.

There can be any number of computers 1702 associated with, or external to, a computer system containing computer 1702, with each computer 1702 communicating over network 1730. Further, the terms "client," "user," and other appropriate terminology can be used interchangeably, as appropriate, without departing from the scope of the present disclosure. Moreover, the present disclosure contemplates that many users can use one computer 1702 and one user can use multiple computers 1702.

Described implementations of the subject matter can include one or more features, alone or in combination.

For example, in a first implementation, a computer-implemented method, including: receiving shot gathers formed from a plurality of shots; converting the shot gather into one or more plane-wave gathers; selecting one of the plane-wave gathers; extrapolating source-side wavefields of the plane-wave gather; extrapolating and decomposing receiver-side wavefields of the plane-wave gather; forming a pseudo dip-angle gather by applying an imaging condition to the extrapolated plane-wave source-side wavefields and the extrapolated and decomposed plane-wave receiver-side wavefields; extracting the diffraction image information from the pseudo dip-angle gather; and generating a stacked diffraction image representative of subsurface features of a portion of the earth.

The foregoing and other described implementations can each, optionally, include one or more of the following features:

A first feature, combinable with any of the following features, the method further including repeating, for each remaining plane-wave gather, the steps of: extrapolating the source-side wavefields of the plane-wave gather; extrapolating and decomposing the receiver-side wavefields of the plane-wave gather; and forming the pseudo-dip angle gather by applying the imaging condition to the extrapolated plane-wave source-side wavefields and the extrapolated and decomposed plane-wave receiver-side wavefields.

A second feature, combinable with any of the previous or following features, wherein forming a pseudo dip-angle gather by applying an imaging condition to the extrapolated plane-wave source-side wavefields and the extrapolated and decomposed plane-wave receiver-side wavefields includes combining the extrapolated source-side wavefields and the extrapolated and decomposed receiver-side wavefields generated from all of the plane-wave gathers into the pseudo-dip angle gather.

A third feature, combinable with any of the previous or following features, wherein converting the shot gather into one or more plane-wave gathers includes applying a Radon transform to the shot gather to generate the one or more plane-wave gathers.

A fourth feature, combinable with any of the previous or following features, wherein decomposing the receiver-side wavefields of the plane-wave gather includes applying a recursive Radon transform to the receiver-side wavefields of the plane-wave gather.

A fifth feature, combinable with any of the previous or following features, wherein applying a recursive Radon transform to the receiver-side wavefields of the plane-wave gather includes applying a windowed recursive Radon transform to the receiver-side wavefields of the plane-wave gather.

A sixth feature, combinable with any of the previous or following features, wherein extracting the diffraction image information from the pseudo-dip angle gather includes applying a windowed median filter to the pseudo dip-angle gather to remove reflection energy information from the diffraction energy information.

A seventh feature, combinable with any of the previous or following features, wherein combining the extrapolated plane-wave source-side wavefields and the extrapolated and decomposed plane-wave receiver-side wavefields to form a pseudo-dip angle gather includes forming the pseudo dip-angle using the relationships:

$$I(x,z,\beta;p)=\int S(x,z,\omega;p)R(x,z,\omega,\theta_r;p)d\omega,$$

$$\beta=(\theta'_s+\theta_r)/2,$$

where $I(x,z,\beta;p)$ is the pseudo dip-angle gather; $S(x,z,\omega;p)$ represents the extrapolated plane-wave source-side wavefields at spatial location $(x,z)$ with a ray parameter p corresponding to a surface incident angle and frequency $\omega$; $R(x,z,\omega, \theta_r;p)$ represents the decomposed plane-wave receiver-side wavefields obtained using the recursive Radon transform; $\theta'_s$ is the surface incident angle of the plane-wave gather; $\theta_r$ is the propagation angle of the plane-wave receiver-side wavefield; and $\beta$ is the pseudo dip-angle.

In a second implementation, a non-transitory, computer-readable medium storing one or more instructions executable by a computer system to perform operations including: receiving shot gathers formed from a plurality of shots; converting the shot gather into one or more plane-wave gathers; selecting one of the plane-wave gathers; extrapolating source-side wavefields of the plane-wave gather; extrapolating and decomposing receiver-side wavefields of the plane-wave gather; forming a pseudo-dip angle gather by applying an imaging condition to the extrapolated plane-wave source-side wavefields and the extrapolated and decomposed plane-wave receiver-side wavefields; combining the extrapolated plane-wave source-side wavefields and the extrapolated and decomposed plane-wave receiver-side wavefields to form a pseudo dip-angle gather; extracting the diffraction image information from the pseudo dip-angle gather; and generating a stacked diffraction image representative of subsurface features of a portion of the earth.

The foregoing and other described implementations can each, optionally, include one or more of the following features:

A first feature, combinable with any of the following features, wherein the one or more instructions further include instructions executable by a computer system repeating, for each remaining plane-wave gather, the steps of: extrapolating the source-side wavefields of the plane-wave gather; extrapolating and decomposing the receiver-side wavefields of the plane-wave gather; and applying the imaging condition to the extrapolated plane-wave source-side wavefields and the extrapolated and decomposed plane-wave receiver-side wavefields.

A second feature, combinable with any of the previous or following features, wherein forming a pseudo dip-angle gather by applying an imaging condition to the extrapolated plane-wave source-side wavefields and the extrapolated and decomposed plane-wave receiver-side wavefields includes combining the extrapolated source-side wavefields and the extrapolated and decomposed receiver-side wavefields generated from all of the plane-wave gathers into the pseudo-dip angle gather.

A third feature, combinable with any of the previous or following features, wherein converting the shot gather into one or more plane-wave gathers includes applying a Radon transform to the shot gather to generate the one or more plane-wave gathers.

A fourth feature, combinable with any of the previous or following features, wherein decomposing the receiver-side wavefields of the plane-wave gather includes applying a recursive Radon transform to the receiver-side wavefields of the plane-wave gather.

A fifth feature, combinable with any of the previous or following features, wherein applying a recursive Radon transform to the receiver-side wavefields of the plane-wave gather includes applying a windowed recursive Radon transform to the receiver-side wavefields of the plane-wave gather.

A sixth feature, combinable with any of the previous or following features, wherein extracting the diffraction image information from the pseudo-dip angle gather includes applying a windowed median filter to the pseudo dip-angle gather to remove reflection energy information from the diffraction energy information.

A seventh feature, combinable with any of the previous or following features, wherein combining the extrapolated plane-wave source-side wavefields and the extrapolated and decomposed plane-wave receiver-side wavefields to form a pseudo-dip angle gather includes forming the pseudo dip-angle using the relationships:

$$I(x,z,\beta;p) = \int S(x,z,\omega;p) R(x,z,\omega,\theta_r;p) d\omega,$$

$$\beta = (\theta'_s + \theta_r)/2,$$

where $I(x,z,\beta;p)$ is the pseudo dip-angle gather; $S(x,z,\omega;p)$ represents the extrapolated plane-wave source-side wavefields at spatial location (x,z) with a ray parameter p corresponding to a surface incident angle and frequency $\omega$; $R(x,z,\omega,\theta_r;p)$ represents the decomposed plane-wave receiver-side wavefields obtained using the recursive Radon transform; $\theta'_s$ is the surface incident angle of the plane-wave gather; $\theta_r$ is the propagation angle of the plane-wave receiver-side wavefield; and $\beta$ is the pseudo dip-angle.

In a third implementation, a computer-implemented system, comprising one or more processors and a non-transitory computer-readable storage medium coupled to the one or more processors and storing programming instructions for execution by the one or more processors, the programming instructions instructing the one or more processors to: receive shot gathers formed from a plurality of shots; converting the shot gather into one or more plane-wave gathers; select one of the plane-wave gathers; extrapolate source-side wavefields of the plane-wave gather; extrapolate and decompose receiver-side wavefields of the plane-wave gather; form a pseudo dip-angle gather by applying an imaging condition to the extrapolated plane-wave source-side wavefields and the extrapolated and decomposed plane-wave receiver-side wavefields; extract the diffraction image information from the pseudo dip-angle gather; and generate a stacked diffraction image representative of subsurface features of a portion of the earth.

The foregoing and other described implementations can each, optionally, include one or more of the following features:

A first feature, combinable with any of the following features, wherein, for each remaining plane-wave gather, the programming instructions are operable to instruct the one or more processors to: extrapolate the plane-wave source-side wavefields of the plane-wave gather; extrapolate and decompose the receiver-side wavefields of the plane-wave gather; and applying the imaging condition to the extrapolated plane-wave source-side wavefields and the extrapolated and decomposed plane-wave receiver-side wavefields.

A second feature, combinable with any of the previous or following features, wherein the programming instructions operable to instruct the one or more processors to form a pseudo dip-angle gather by apply an imaging condition to the extrapolated plane-wave source-side wavefields and the extrapolated and decomposed plane-wave receiver-side wavefields include programming instructions operable to instruct the one or more processors to combine the extrapolated source-side wavefields and the extrapolated and decomposed receiver-side wavefields generated from all of the plane-wave gathers into the pseudo-dip angle gather.

A third feature, combinable with any of the previous or following features, wherein converting the shot gather into one or more plane-wave gathers includes applying a Radon transform to the shot gather to generate the one or more plane-wave gathers.

A fourth feature, combinable with any of the previous or following features, wherein deconstructing the receiver-side wavefields of the plane-wave gather includes applying a recursive Radon transform to the receiver-side wavefields of the plane-wave gather.

A fifth feature, combinable with any of the previous or following features, wherein applying a recursive Radon transform to the receiver-side wavefields of the plane-wave gather includes applying a windowed recursive Radon transform to the receiver-side wavefields of the plane-wave gather.

A sixth feature, combinable with any of the previous or following features, wherein the programming instructions operable to instruct the one or more processors to extract the diffraction image information from the pseudo-dip angle gather includes programming instructions operable to instruct the one or more processors to apply a windowed median filter to the pseudo dip-angle gather to remove reflection energy information from the diffraction energy information.

A seventh feature, combinable with any of the previous or following features, wherein the programming instructions operable to instruct the one or more processors to combine the extrapolated plane-wave source-side wavefields and the extrapolated and decomposed plane-wave receiver-side wavefields to form a pseudo-dip angle gather includes programming instructions operable to instruct the one or more processors to form the pseudo dip-angle using the relationships:

$$I(x,z,\beta;p) = \int S(x,z,\omega;p) R(x,z,\omega,\theta_r;p) d\omega,$$

$$\beta = (\theta'_s + \theta_r)/2,$$

where $I(x, z, \beta; p)$ is the pseudo dip-angle gather; $S(x,z,\omega;p)$ represents the extrapolated plane-wave source-side wavefields at spatial location (x,z) with a ray parameter p corresponding to a surface incident angle and frequency $\omega$; $R(x,z,\omega,\theta_r;p)$ represents the decomposed plane-wave receiver-side wavefields obtained using the recursive Radon transform; $\theta'_s$ is the surface incident angle of the plane-wave gather; $\theta_r$ is the propagation angle of the plane-wave receiver-side wavefield; and $\beta$ is the pseudo dip-angle.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A computer-implemented method performed by one or more processors for generating an image of subsurface features of a portion of the earth using diffraction energy, the method comprising the following operations:

receiving a shot gather formed from a plurality of shots;
converting the shot gather into one or more plane-wave gathers based on the following equation:

$$U_r(x_r,t;p) = \int u_r(x_s,t+p(x_s-x_0);x_r)dx_s,$$

where p is a ray parameter obtained by $\sin(\theta_0)/v_0$, $\theta_0$ is a surface incident angle that is measured from a z-axis to an initial direction of plane-wave propagation, $v_0$ is a surface velocity, $x_0$ represents a plane-wave origin at a surface, $x_s$ and $x_r$ represent source and receiver locations, respectively, t represents time, $u_r(x_s,t;x_r)$ represents the shot gather prior to conversion, and $U_r(x_r,t;p)$ represents the plane-wave gathers after the conversion;

selecting one of the plane-wave gathers;

extrapolating source-side wavefields of the plane-wave gather downward;
extrapolating receiver-side wavefields of the plane-wave gather downward and decomposing the extrapolated receiver-side wavefields, wherein decomposing the receiver-side wavefields of the plane-wave gather comprises applying a recursive Radon transform to the receiver-side wavefields of the plane-wave gather;
forming a pseudo dip-angle gather by applying an imaging function to the extrapolated plane-wave source-side wavefields and the decomposed plane-wave receiver-side wavefields;
extracting the diffraction image information from the pseudo dip-angle gather by using a windowed median filter; and
generating a stacked diffraction image representative of subsurface features of a portion of the earth, wherein the stacked diffraction image is used in well design to access a reservoir.

2. The computer-implemented method of claim 1, further comprising:
repeating, for each remaining plane-wave gather, the steps of:
extrapolating the source-side wavefields of the plane-wave gather;
extrapolating the receiver-side wavefields of the plane-wave gather downward and decomposing the extrapolated receiver-side wavefields; and
forming the pseudo-dip angle gather by applying the imaging function to the extrapolated plane-wave source-side wavefields and the decomposed plane-wave receiver-side wavefields, and
wherein forming a pseudo dip-angle gather comprises combining the extrapolated source- side wavefields and the decomposed receiver-side wavefields generated from all of the plane- wave gathers into the pseudo-dip angle gather.

3. The computer-implemented method of claim 1, wherein applying a recursive Radon transform to the receiver-side wavefields of the plane-wave gather comprises applying a windowed recursive Radon transform to the receiver-side wavefields of the plane-wave gather.

4. The computer-implemented method of claim 1, wherein extracting the diffraction image information from the pseudo-dip angle gather comprises applying a windowed median filter to the pseudo dip-angle gather to remove reflection energy information from the diffraction energy information.

5. The computer-implemented method of claim 1, wherein combining the extrapolated plane-wave source-side wavefields and the extrapolated and decomposed plane-wave receiver-side wavefields to form a pseudo-dip angle gather comprises forming the pseudo dip-angle using the relationships:

$$I(x,z,\beta;p)=\int S(x,z,\omega;p)R(x,z,\omega\theta_r;p)d\omega,$$

$$\beta=(\theta'_s+\theta_r)/2,$$

where $I(x,z,\beta;p)$ is the pseudo dip-angle gather; $S(x,z,\omega;p)$ represents the extrapolated plane-wave source-side wavefields at spatial location $(x,z)$ with a ray parameter p corresponding to a surface incident angle and frequency $\omega$; $R(x,z,\omega,\theta_r;p)$ represents the decomposed plane-wave receiver-side wavefields obtained using the recursive Radon transform; $\theta'_s$ is the surface incident angle of the plane-wave gather; $\theta_r$ is the propagation angle of the plane-wave receiver-side wavefield; and $\beta$ is the pseudo dip-angle.

6. A computer program product encoded on a non-transitory medium, the computer program product comprising computer readable instructions for causing one or more processors to perform operations comprising:
receiving a shot gather formed from a plurality of shots;
converting the shot gather into one or more plane-wave gathers by using a linear Radon transform based on the following equation:

$$U_r(x_r,t;p)=\int u_r(x_s,t+p(x_s-x_0);x_r)dx_s,$$

where p is a ray parameter quantified by $\sin(\theta_0)/v_0$, $\theta_0$ is a surface incident angle that is measured from a z-axis to an initial direction of plane-wave propagation, $v_0$ is a surface velocity, $x_0$ represents a plane-wave origin at a surface, $x_s$ and $x_r$ represent source and receiver locations, respectively, t represents time, $u_r(x_s,t;x_r)$ represents the shot gather prior to conversion, and $U_r(x_r,t;p)$ represents the plane-wave gathers after the conversion;
selecting one of the plane-wave gathers;
extrapolating source-side wavefields of the plane-wave gather downward;
extrapolating receiver-side wavefields of the plane-wave gather downward and decomposing the extrapolated receiver-side wavefields, wherein decomposing the receiver-side wavefields of the plane-wave gather comprises applying a recursive Radon transform to the receiver-side wavefields of the plane-wave gather;
forming a pseudo dip-angle gather by applying an imaging function to the extrapolated plane-wave source-side wavefields and the decomposed plane-wave receiver-side wavefields;
extracting the diffraction image information from the pseudo dip-angle gather by using a windowed median filter; and
generating a stacked diffraction image representative of subsurface features of a portion of the earth, wherein the stacked diffraction image is used in well design to access a reservoir.

7. The computer program product of claim 6, wherein the computer readable instructions are further operable to cause the one or more processors to:
repeat, for each remaining plane-wave gather, the steps of:
extrapolating the source-side wavefields of the plane-wave gather;
extrapolating the receiver-side wavefields of the plane-wave gather downward and decomposing the extrapolated receiver-side wavefields; and
forming the pseudo-dip angle gather by applying the imaging function to the extrapolated plane-wave source-side wavefields and the decomposed plane-wave receiver-side wavefields, and
wherein forming a pseudo dip-angle gather comprises combining the extrapolated source-side wavefields and the decomposed receiver-side wavefields generated from all of the plane-wave gathers into the pseudo-dip angle gather.

8. The computer program product of claim 6, wherein applying a recursive Radon transform to the receiver-side wavefields of the plane-wave gather comprises applying a windowed recursive Radon transform to the receiver-side wavefields of the plane-wave gather.

9. The computer program product of claim 6, wherein extracting the diffraction image information from the pseudo-dip angle gather comprises applying a windowed median filter to the pseudo dip-angle gather to remove reflection energy information from the diffraction energy information.

10. The computer program product of claim 6, wherein combining the extrapolated plane-wave source-side wavefields and the extrapolated and decomposed plane-wave receiver-side wavefields to form a pseudo-dip angle gather comprises forming the pseudo dip-angle using the relationships:

$$I(x,z,\beta;p)=\int S(x,z,\omega;p)R(x,z,\omega,\theta_r;p)d\omega,$$

$$\beta=(\theta'_s+\theta_r)/2,$$

where $I(x,z,\beta;p)$ is the pseudo dip-angle gather; $S(x,z,\omega;p)$ represents the extrapolated plane-wave source-side wavefields at spatial location $(x,z)$ with a ray parameter p corresponding to a surface incident angle and frequency $\omega$; $R(x,z,\omega,\theta_r;p)$ represents the decomposed plane-wave receiver-side wavefields obtained using the recursive Radon transform; $\theta'_s$ is the surface incident angle of the plane-wave gather; $\theta_r$ is the propagation angle of the plane-wave receiver-side wavefield; and $\beta$ is the pseudo dip-angle.

11. An apparatus for generating an image of subsurface features using diffraction energy information comprising:
one or more processors; and
a non-transitory computer-readable storage medium coupled to the one or more processors and storing programming instructions for execution by the one or more processors, the programming instructions operable to instruct the one or more processors to:
receiving a shot gather formed from a plurality of shots;
converting the shot gather into one or more plane-wave gathers based on the following equation:

$$U_r(x_r,t;p)=\int u_r(x_s,t+p(x_s-x_0);x_r)dx_s,$$

where p is a ray parameter quantified by $\sin(\theta_0)/v_0$, $\theta_0$ is a surface incident angle that is measured from a z-axis to an initial direction of plane-wave propagation, $v_0$ is a surface velocity, $x_0$ represents a plane-wave origin at a surface, $x_s$ and $x_r$ represent source and receiver locations, respectively, t represents time, $u_r(x_s,t;x_r)$ represents the shot gather prior to conversion, and $U_r(x_r,t;p)$ represents the plane-wave gathers after the conversion;
selecting one of the plane-wave gathers;
extrapolating source-side wavefields of the plane-wave gather downward;
extrapolating receiver-side wavefields of the plane-wave gather downward and decomposing the extrapolated receiver-side wavefields, wherein decomposing the receiver-side wavefields of the plane-wave gather comprises applying a recursive Radon transform to the receiver-side wavefields of the plane-wave gather;
forming a pseudo dip-angle gather by applying an imaging function to the extrapolated plane-wave source-side wavefields and the decomposed plane-wave receiver-side wavefields;
extracting the diffraction image information from the pseudo dip-angle gather by using a windowed median filter; and
generating a stacked diffraction image representative of subsurface features of a portion of the earth, wherein the stacked diffraction image is used in well design to access a reservoir.

12. The apparatus of claim 11, wherein, for each remaining plane-wave gather, the programming instructions are operable to instruct the one or more processors to:
extrapolating the source-side wavefields of the plane-wave gather;
extrapolating the receiver-side wavefields of the plane-wave gather downward and decomposing the extrapolated receiver-side wavefields; and
forming the pseudo-dip angle gather by applying the imaging function to the extrapolated plane-wave source-side wavefields and the decomposed plane-wave receiver-side wavefields, and
wherein the programming instructions operable to instruct the one or more processors to combine the extrapolated plane-wave source-side wavefields and the decomposed plane-wave receiver-side wavefields generated from all of the plane-wave gathers into the pseudo-dip angle gather.

13. The apparatus of claim 11, wherein the programming instructions operable to instruct the one or more processors to applying a recursive Radon transform to the receiver-side wavefields of the plane-wave gather comprises programming instructions operable to instruct the one or more processors to apply a windowed recursive Radon transform to the receiver-side wavefields of the plane-wave gather.

14. The apparatus of claim 11, wherein the programming instructions operable to instruct the one or more processors to extract the diffraction image information from the pseudo-dip angle gather comprises programming instructions operable to instruct the one or more processors to apply a windowed median filter to the pseudo dip-angle gather to remove reflection energy information from the diffraction energy information.

\* \* \* \* \*

UNITED STATES PATENT AND TRADEMARK OFFICE
CERTIFICATE OF CORRECTION

PATENT NO. : 11,681,043 B2
APPLICATION NO. : 16/559008
DATED : June 20, 2023
INVENTOR(S) : Lu Liu, Yi Luo and Tong Wang Fei It is certified that error appears in the above-identified patent and that said Letters Patent is hereby corrected as shown below:

In the Claims

In Column 22, Line 56, Claim 1, please replace "Ur(xrt;p)" with -- Ur(xr,t;p) --

In Column 23, Line 55, Claim 5, please replace "$I(x,z,\beta;p)=\int S(x,z,\omega;p)R(x,z,\omega\theta r;p)d\omega$," with -- $I(x,z,\beta;p)=\int S(x,z,\omega;p)R(x,z,\omega,\theta r;p)d\omega$, --

In Column 25, Line 42, Claim 11, please replace "ur (xs,t;xr)" with -- ur(xs,t:xr) --

Signed and Sealed this
Eighth Day of August, 2023

*Katherine Kelly Vidal*
*Director of the United States Patent and Trademark Office*